(12) United States Patent
Gupta et al.

(10) Patent No.: US 10,818,058 B1
(45) Date of Patent: Oct. 27, 2020

(54) ANALYZING DIGITAL IMAGE MODIFICATIONS TO GENERATE, PUBLISH, AND PRESENT DIGITAL IMAGE-EDITING TUTORIALS

(71) Applicant: Adobe Inc., San Jose, CA (US)

(72) Inventors: Subham Gupta, Roorkee (IN); Ashutosh Dwivedi, Bengaluru (IN); Sudhir Tubegere Shankaranarayana, Bangalore (IN); Jaideep Jeyakar, Bangalore (IN)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/513,257

(22) Filed: Jul. 16, 2019

(51) Int. Cl.
*G06T 11/60* (2006.01)
*G06T 13/80* (2011.01)
*G06F 3/0482* (2013.01)
*G09B 5/06* (2006.01)
*G06T 7/20* (2017.01)
*G09B 19/00* (2006.01)

(52) U.S. Cl.
CPC ............ *G06T 11/60* (2013.01); *G06F 3/0482* (2013.01); *G06T 7/20* (2013.01); *G06T 13/80* (2013.01); *G09B 5/065* (2013.01); *G09B 19/003* (2013.01)

(58) Field of Classification Search
CPC ......... G06F 3/0482; G06T 7/20; G06T 11/60; G06T 13/80; G09B 5/065; G09B 19/003
USPC .......................................................... 345/619
See application file for complete search history.

(56) References Cited

U.S. PATENT DOCUMENTS

| | | | |
|---|---|---|---|
| 10,540,906 B1 * | 1/2020 | Fieldman | G06F 3/0481 |
| 2006/0031209 A1 * | 2/2006 | Ahlberg | G06F 9/451 |
| 2009/0150937 A1 * | 6/2009 | Ellis | H04N 21/2335 |
| | | | 725/46 |
| 2009/0307632 A1 * | 12/2009 | Hasegawa | G06F 3/0486 |
| | | | 715/835 |
| 2016/0179345 A1 * | 6/2016 | Zhao | G06F 3/04817 |
| | | | 715/708 |
| 2017/0291068 A1 * | 10/2017 | Curley | G09B 5/02 |

* cited by examiner

*Primary Examiner* — Sae Won Yoon
(74) *Attorney, Agent, or Firm* — Keller Jolley Preece

(57) ABSTRACT

The present disclosure relates to systems, methods, and non-transitory computer readable media for generating and providing an animated tutorial based on determining modifications made to a digital image. For example, the disclosed systems can determine modifications made to a digital image based on comparing an initial state of a digital image with a modified state of the digital image and/or based on analyzing an action history within a digital image editing application. The disclosed systems can generate an animated tutorial based on the determined modifications and can further generate a deep link that references the animated tutorial. In addition, the disclosed systems can provide the animated tutorial to a social networking system together with the deep link to cause devices to execute a digital image editing application and present the animated tutorial upon selection of the deep link.

20 Claims, 14 Drawing Sheets

Initial Digital Image Information 400

Temperature = 2000
Tint = +30
Saturation = 0
Sharpness = 50
Luminance Smoothing = 15
Exposure = +0.50

Modified Digital Image Information 402

Temperature = 2605
Tint = +50
Saturation = 0
Sharpness = 40
Luminance Smoothing = 26
Exposure = +0.88

Fig. 4

Tutorial File 502

-Show Title: "A Few Easy Edits to Enhance Your Photos."

- Show Description: "Learn How To Edit Photos With Just a Few Clicks."

- Show Step Name: "Let's begin by adjusting the lighting."
    - Highlight Lighting Element

- Show Step Name: "Change the exposure as indicated to make the photo brighter or darker."
    -Indicate exposure level on Slider Element at +0.88

ANALYZING DIGITAL IMAGE MODIFICATIONS TO GENERATE, PUBLISH, AND PRESENT DIGITAL IMAGE-EDITING TUTORIALS

BACKGROUND

Advancements in software and hardware platforms have led to a variety of improvements in systems that provide tutorials for editing digital images. Indeed, educator devices (e.g., devices of digital image editing experts) can utilize digital content systems to generate digital video tutorials and distribute these digital video tutorials for utilization by learner devices (e.g., devices of novices that seek to learn digital image editing techniques). For example, digital content systems are now able to record digital videos of a display on an educator device performing digital image editing techniques. Learner devices can access these digital videos (e.g., via a social networking platform) and then playback the digital video at the learner device. Despite these advances however, conventional digital content systems continue to suffer from a number of disadvantages, such as inefficiencies in generating animated tutorials, inefficiencies in replaying and implementing animated tutorials at learner devices, and inflexibility in generating animated tutorials in relation to different learner devices.

Thus, there are several technical disadvantages with regard to conventional digital content systems.

SUMMARY

One or more embodiments described herein provide benefits and solve one or more of the foregoing or other problems in the art with systems, methods, and non-transitory computer readable media that analyze digital image modifications to generate, publish, and present digital image editing tutorials. In particular, the disclosed systems can provide an end-to-end, in-app solution for generating, publishing, and consuming digital image editing tutorials across various platforms of educator devices and learner devices. To illustrate, the disclosed systems can identify a modified digital image at an educator device generated via a digital image editing application. The disclosed systems can automatically identify modified parameters (e.g., edit settings) corresponding to the digital image editing application and generate an animated tutorial that explains how to modify the edit settings within the digital image editing application to generate the modified digital image. In one or more embodiments, the disclosed systems also automatically generate social networking posts that include animated visual representations of the tutorial and a deep link to the animated tutorial.

Accordingly, learner devices can identify and interact with the social networking post to access and consume the animated tutorial. In particular, in response to selection of the deep link, the disclosed systems can automatically launch the digital image editing application at the learner device and download the animated tutorial for playback within the image editing application. The disclosed systems can generate these in-app animated tutorials to illustrate user modifications specific to individual device platforms and can share these animated tutorials across multiple social media platforms. Thus, the disclosed systems provide an efficient and flexible way to generate, publish, and present digital image editing tutorials across educator and learner devices.

Additional features and advantages of the present application will be set forth in the following description.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 4 illustrates example modified digital image information in accordance with one or more embodiments;

FIG. 5 illustrates an example tutorial file in accordance with one or more embodiments;

DETAILED DESCRIPTION

Figure 1:
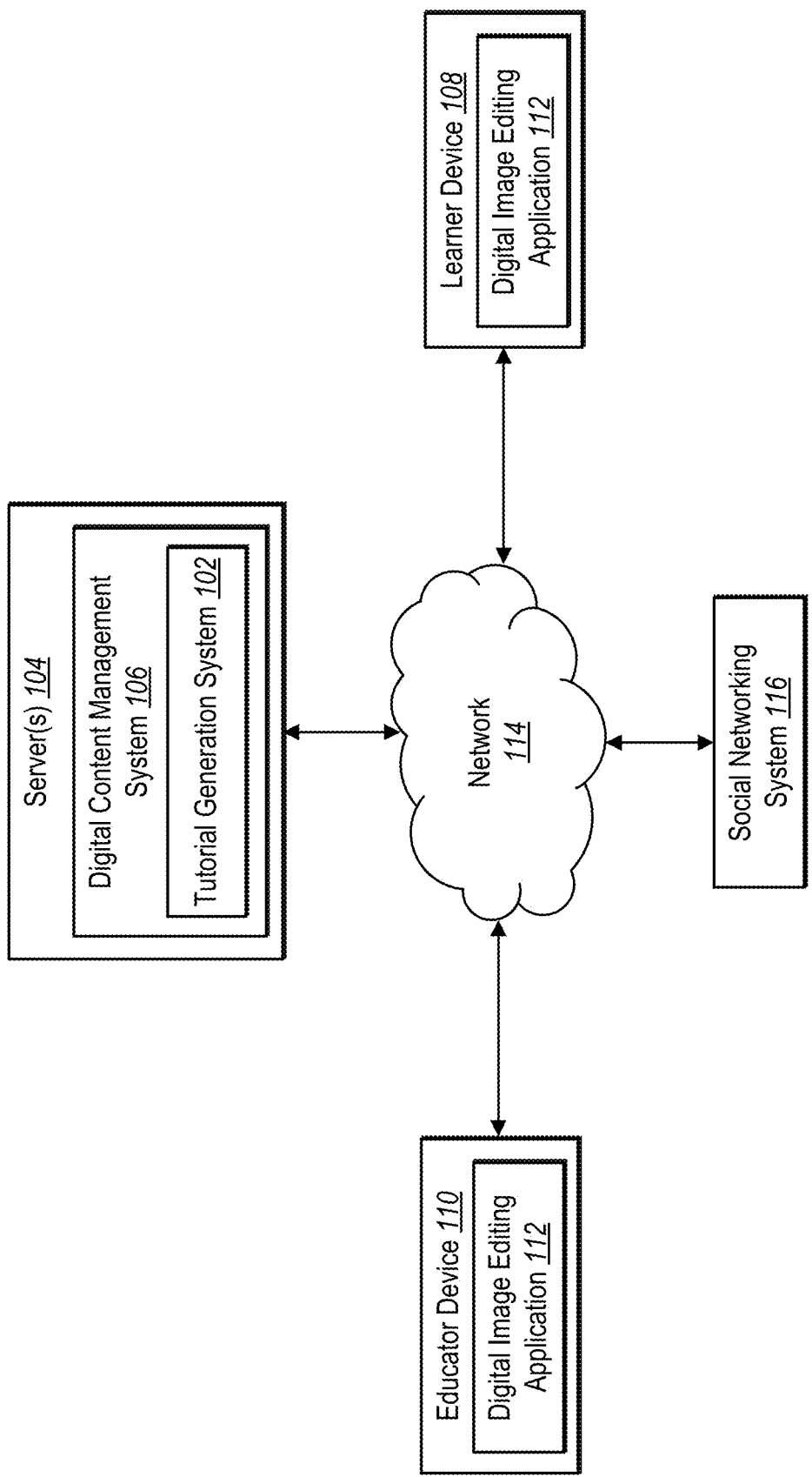
FIG. 1 illustrates an example environment for implementing a tutorial generation system in accordance with one or more embodiments.

One or more embodiments described herein provide benefits and solve one or more of the foregoing or other problems in the art with a tutorial generation system that analyzes modifications to a digital image and dynamically generates, publishes, and presents an animated tutorial. In particular, the tutorial generation system can generate an animated tutorial based on parameters (e.g., edit settings) associated with a modified or post-processed digital image within a digital image editing application on an educator device. In some embodiments, the tutorial generation system determines modifications made to a digital image based on analyzing a user action history associated with a modified digital image within a digital image editing application on an educator device. Based on these detected modifications, the tutorial generation system can generate an animated tutorial, publish the animated tutorial to social media platforms via a deep link of a social media post, and then present the animated tutorial within the digital image editing application on a learner device. Accordingly, the tutorial generation system provides an end-to-end, in-app solution for efficiently and flexibly generating, publishing, and consuming animated tutorials across educator and learner devices.

As just mentioned, to generate the animated tutorial, the tutorial generation system can extract modifications (e.g., edit settings) to a digital image. For example, the tutorial generation system can compare an initial state of a digital image with a modified state of the digital image to determine modifications made to the digital image. Particularly, the tutorial generation system can determine changes or modifications made to settings or parameters within a digital image editing application to alter the appearance of the digital image from an initial state to a modified state.

In some embodiments, the tutorial generation system determines modifications by monitoring and/or analyzing an action history within a digital image editing application. For instance, the tutorial generation system can track changes or alterations made to various edit settings within a digital image editing application as a user (e.g., an educator) makes changes via an educator device. Thus, the tutorial generation system can determine modifications to a digital image by comparing edit settings across different states of a digital image and/or tracking action history within the digital image editing application itself.

Upon identifying modifications to a digital image, the tutorial generation system can build an animated tutorial utilizing the modifications. In particular, the tutorial generation system can generate an animated tutorial that identifies modifications to parameters of a digital image editing application to implement the modifications. For example, upon detecting a change to edit settings of the digital image editing application between an initial state and a modified state of a digital image, the tutorial generation system can identify parameters within the digital image editing application that are used to modify the edit settings. The tutorial generation system can then generate an animated tutorial illustrating step-by-step modifications to implement the changes to the edit settings.

In some embodiments, the tutorial generation system generates animated tutorials while pruning some modifications detected in a processed digital image. For example, the tutorial generation system can establish a threshold measure of change for parameters of a digital image editing application. If a modification fails to satisfy the threshold measure of change, the tutorial generation system can prune the modification from the animated tutorial. Thus, the tutorial generation system can flexibly modify animated tutorials to highlight significant changes.

In addition, the tutorial generation system can personalize animation tutorials in relation to particular educator devices. For example, the tutorial generation system can add author details to an animation tutorial, revise modifications illustrated in an animated tutorial (e.g., add or delete detected edit settings), add or revise captions, and/or modify the order or sequence of modifications within an animation tutorial. Thus, the tutorial generation system can allow personalize animation tutorials to the unique needs of particular educators and educator devices.

In some embodiments, the tutorial generation system generates an animated tutorial in the form of a tutorial document or a tutorial file that includes code indicating edit settings of the digital image edition application. In particular, the tutorial generation system can generate the animated tutorial in a common format recognizable within digital image editing applications across multiple device platforms, such as platforms for mobile devices, desktop devices, and/or web devices. Thus, the tutorial generation system can generate animated tutorials that dynamically adjust to the specific user interface elements and corresponding parameters of different versions of digital image editing applications corresponding to a variety of different learner devices.

As mentioned, the tutorial generation system can generate publishable content for an educator device to share with learner devices (e.g., via social media). For example, the tutorial generation system can generate and publish one or more social media posts that allow learner devices to access and utilize the animated tutorial. In some embodiments, the tutorial generation system generates a social media post that includes a visual representation of the animated tutorial and a deep link to the animated tutorial.

To elaborate, the tutorial generation system can store the animated tutorial at a server device. In addition, the tutorial generation system can generate a deep link that includes a reference to the animated tutorial as well as the digital image editing application used to modify the digital image. In some embodiments, the tutorial generation system further generates a visual representation of the animated tutorial such as an animated GIF that illustrates an initial state of a digital image and a modified state of the digital image. The tutorial generation system can publish a social media post that includes the deep link and the visual representation. Upon receiving an interaction with the deep link from a learner device, the tutorial generation system can cause the learner device to open the corresponding digital image editing application (or prompt installation of such application if it is not already installed on the learner device). Moreover, the tutorial generation system can download the animated tutorial to the learner device and display the animated tutorial within the digital image editing application.

As mentioned above, conventional systems have a number of shortcomings with respect to efficiency and flexibility of operation For example, educator devices implementing conventional systems often utilize a digital image editing application to implement modifications to a digital image and an additional digital video recording application that simultaneously records tutorials. After capturing a digital video of the modifications, conventional systems often require educator devices to modify, edit, and/or re-capture digital video to generate a final tutorial. This process of capturing digital video, editing digital video, and re-capturing additional cuts requires significant time and resources. Indeed, the time and computing power needed to make tutorials utilizing conventional systems significantly exceeds that of modifying the digital image itself.

As a further example of the inefficiency of conventional digital content systems, the tutorials generated via conventional systems are not actionable. More specifically, the educational content of many articles or video tutorials generated via conventional systems is only viewable and (in many cases) only viewable within applications separate from a digital image editing application. Thus, learning devices must manage multiple applications to view the tutorial content while making any digital image modifications. Accordingly, significant friction exists between watching a tutorial on a social media website, for example, and actually implementing the editing process in a digital image editing application.

In addition, conventional digital content systems are inflexible. For instance, conventional systems are rigidly specific to a particular platform. To illustrate, conventional systems often generate a digital video tutorial reflecting digital image modifications particular to a specific platform (e.g., a version of a digital image editing application specific to a desktop computer). For learner devices implementing digital image editing applications on a different platform (e.g., a version of a digital image editing application on a mobile device), the resulting tutorial is inaccurate and unhelpful. Accordingly, conventional systems often require educator devices to record multiple different tutorials for different platforms. This rigid approach fails to adapt to accommodate feature differences across platforms and further exacerbates the inefficiencies discussed above.

The tutorial generation system provides several advantages relative to conventional systems. As one example, the tutorial generation system improves efficiency over conventional systems. For instance, whereas conventional systems waste computing time and computing power capturing, editing, and re-capturing digital videos of digital image modifications (sometimes in entirely separate applications/interfaces), the tutorial generation system saves computing time and computing power by automatically generating animated tutorials based on modifications detected via the digital image editing application used to make modifications to a digital image. Indeed, the disclosed systems can detect a modified digital image, generate an animated tutorial that explains modifications within the digital image editing application, and distribute the animated tutorial for playback within the digital image editing application at learner devices with little user input, time, or computing resources.

Additionally, the tutorial generation system improves efficiency over conventional systems by generating animated tutorials that are actionable. More specifically, the tutorial generation system generates animated tutorials that are not only viewable but also interactive within a digital image editing application. Thus, learner devices can make depicted changes (or other changes) by interacting with various edit settings or parameters of the digital image editing application during the animated tutorial. Indeed, in some embodiments, the tutorial generation system provides step-by-step instructions for modifying digital image modifications and performs those modifications on a digital image selected at the learner device. Thus, the tutorial generation system reduces the friction between watching a tutorial and implementing digital changes by generating animated tutorials that are implemented directly within a digital image editing application.

As another advantage, the tutorial generation system improves flexibility over conventional digital animation systems. For example, while many conventional systems are platform-specific, the tutorial generation system is compatible with many device platforms and/or digital image editing applications. Indeed, because the tutorial generation system generates animated tutorials in a universal, platform-independent format (e.g., a particular file type of the tutorial document/file), the tutorial generation system generates tutorials that are adaptable to different device types. For example, the tutorial generation system can generate an animated tutorial that, when played on a desktop, illustrates revisions to user interface elements unique to the desktop platform. When played on a mobile device, however, the animated tutorial can illustrate revisions to user interface elements unique to the mobile device platform. Thus, the tutorial generation system can generate dynamic animation tutorials that modify to particular platforms of different learner devices.

Due to the above advantages, the tutorial generation system further improves user experiences for both educators as well as learners. Indeed, the tutorial generation system enables educators to more quickly, efficiently, and effectively teach others how to implement particular editing techniques to grow their individual educator brands or reputations. On the flip side, the tutorial generation system helps learners in or around the "first mile experience" more quickly and efficiently gain understanding on how to perform particular edits to digital images. Thus, the tutorial generation system improves engagement and retention for both educators as well as learners.

As illustrated by the foregoing discussion, the present disclosure utilizes a variety of terms to describe features and benefits of the tutorial generation system. Additional detail is hereafter provided regarding the meaning of these terms as used in this disclosure. In particular, the term "animated tutorial" refers to a visual representation of one or more actions within a digital image editing application. In particular, an animated tutorial can include an animation of one or more actions (e.g., parameter modifications) within a digital image editing application to modify a digital image. For example, an animated tutorial can include a step-by-step portrayal of a sequence of modifications to user interface elements corresponding to parameters of a digital image editing application to generate a modified digital image from an initial digital image.

Relatedly, the term "parameter" refers to an edit setting or digital image property within a digital image editing application. For example, a parameter can include an attribute or characteristic associated with a digital image within a digital image editing application. In some embodiments, a parameter can include a digital image property listed within a metadata file such as an Extensible Metadata Platform ("XMP") file. Such parameters include, but are not limited to color, brightness, opacity, saturation, hue, and/or parameters associated with specific editing tools such as a color graph, a lasso tool, a draw tool, a fill tool, or a crop tool.

An educator device and/or learner device can make edits to parameters of digital images by interacting with interface elements associated with various editing tools within a digital image editing application. As used herein, the term "interface element" refers to an interactive element or object within a graphical user interface displayed on a device (e.g., an educator device or a learner device). An educator operating an educator device or a learner operating a learner device can interact with an interface element to make modifications to a digital image. Other interface elements can include a selectable element to publish an animated tutorial or a selectable element to play an animated tutorial.

As mentioned, the tutorial generation system can generate an animated tutorial based on determining modifications made to a digital image. In some embodiments, the tutorial generation system can determine the modifications to the digital image based on comparing an initial state of a digital image with a modified state of a digital image. As used herein, the term "initial state" refers to a state or condition of a digital image before one or more modifications are made. An initial state can include an initial state of a digital image with respect a single modification, where the initial state refers to the digital image before the modification and a modified state refers to the digital image after the modification. Indeed, a "modified state" refers to a state or condition of a digital image after one or more modifications are made to parameters associated with a digital image. Thus, with a sequence of several modifications, multiple initial states may be possible with respect to each modification and multiple modified states may also be possible for each respective modification. In some embodiments, however, the initial state may include only the state of the digital image before any modifications are made, and the modified state may refer only to the resultant digital image after all of the modifications are complete.

In these or other embodiments, the tutorial generation system can determine the modifications to the digital image based on an action history. As used herein, the term "action history" refers to past actions or interactions in relation to a digital image editing application. An action history can include modifications made to parameters within a digital image editing application to modify a digital image. For instance, an action history can include an order in which modifications were made to a digital image and the values of modified parameters corresponding to the modifications. Thus, an action history can represent or reflect changes made to a digital image based on inputs of a user (e.g., an educator) within a digital image editing application.

As also mentioned, the tutorial generation system can generate a deep link that includes a reference to an animated tutorial. As used herein, the term "deep link" refers to a selectable link that points to (or references) content and an application. For example, a deep link can include a reference to an animated tutorial that is playable within a particular digital image editing application. Thus, upon detecting selection of a deep link, the tutorial generation system can cause a learner device to open or execute a particular digital image editing application and play an animated tutorial referenced by the deep link. If, however, the digital image editing application is not installed on the learner device, the deep link can reference instructions whereby the tutorial generation system causes the learner device to open and/or display an install option for the digital image editing application (e.g., via an application store interface).

Additional detail regarding the tutorial generation system will now be provided with reference to the figures. For example, FIG. 1 illustrates a schematic diagram of an example environment for implementing a tutorial generation system 102 in accordance with one or more embodiments. An overview of the tutorial generation system 102 is described in relation to FIG. 1. Thereafter, a more detailed description of the components and processes of the tutorial generation system 102 is provided in relation to the subsequent figures.

As shown in FIG. 1, the environment includes server(s) 104, a learner device 108, an educator device 110, a social networking system 116, and a network 114. Each of the components of the environment can communicate via the network 114, and the network 114 may be any suitable network over which computing devices can communicate. Example networks are discussed in more detail below in relation to FIG. 13.

As mentioned, the environment includes an educator device 110. In particular, the educator device 110 can be one of a variety of computing devices, including a smartphone, a tablet, a smart television, a desktop computer, a laptop computer, a virtual reality device, an augmented reality device, or some other computing device as described in relation to FIG. 13. The educator device 110 can receive user input from a user in the form of clicks, keyboard inputs, touchscreen inputs, etc. In some embodiments, the learner device 108 facilitates modification of digital images and generation of animated tutorials to show how to make modifications to digital images.

Particularly, the educator device 110 includes a digital image editing application 112 whereby an educator can generate a modified digital image from an initial digital image by changing one or more parameters. The digital image editing application 112 may be a web application, a native application installed on the educator device 110 and/or the learner device 108 (e.g., a mobile application, a desktop application, etc.), or a cloud-based application where all or part of the functionality is performed by the server(s) 104. The digital image editing application 112 can present or display information to an educator such as a digital image editing interface including editing tools for modifying various parameters associated with digital images. The digital image editing application 112 can also include an option to publish a generated animated tutorial for viewing by a learner via the learner device 108.

As further mentioned, the environment includes a learner device 108. The learner device 108 can be one of a variety of computing devices, including a smartphone, a tablet, a smart television, a desktop computer, a laptop computer, a virtual reality device, an augmented reality device, or some other computing device as described in relation to FIG. 13. The learner device 108 can receive user input from a user in the form of clicks, keyboard inputs, touchscreen inputs, etc. In some embodiments, the learner device 108 facilitates selection of deep links as well as the consumption of, and participation with, animated tutorials.

In particular, the learner device 108 includes a digital image editing application 112 whereby a learner can view an animated tutorial and make modifications to digital images. Indeed, based on a selection of a deep link, the learner device 108 can open the digital image editing application 112 to present an animated tutorial referenced by the deep link. During the tutorial, a learner can make edits to a digital image by following along with the animated tutorial and/or by changing parameters however they desire.

Additionally, the environment includes a social networking system 116. In particular, the social networking system 116 can communicate with the tutorial generation system 102, the educator device 110, and/or the learner device 108 to perform various social networking functions. For example, the social networking system 116 can publish social media messages that include animated tutorials, deep links, and visual representations of animated tutorials. In some embodiments, the social networking system 116 receives a social media message from the educator device 110 or from the tutorial generation system 102 and posts the social media message for access by the learner device 108. Indeed, the learner device 108 can present the social media message including the visual representation of the animated tutorial along with a deep link and other educator-entered information describing the animated tutorial (e.g., as part of a social networking feed of the learner).

As illustrated in FIG. 1, the environment includes the server(s) 104. The server(s) 104 may generate, store, process, receive, and transmit electronic data, such as animated tutorials, deep links, or animated visual representations of animated tutorials for inclusion in social media posts. For example, the server(s) 104 can transmit data to the learner device 108 to provide an animated tutorial for display via the digital image editing application 112. The server(s) 104 may identify (e.g., monitor and/or receive) data from the educator device 110 in the form of an input to modify a digital image and/or publish an animated tutorial. In some embodiments, the server(s) 104 comprises a digital content server. The server(s) 104 can also comprise an application server, a communication server, a web-hosting server, a social networking server, a digital content campaign server, or a digital communication management server.

As shown in FIG. 1, the server(s) 104 can also include the tutorial generation system 102 (e.g., implemented as part of a digital content management system 106). Although FIG. 1 depicts the tutorial generation system 102 located on the server(s) 104, in some embodiments, the tutorial generation system 102 may be implemented by (e.g., located entirely or in part) on one or more other components of the environment. For example, the tutorial generation system 102 may be implemented by the learner device 108, the educator device 110, and/or a third-party device.

In some embodiments, though not illustrated in FIG. 1, the environment may have a different arrangement of components and/or may have a different number or set of components altogether. For example, environment can include a database for storing animated tutorials (e.g., in the form of tutorial files) and digital images. The database can be housed by the server(s) 104, the educator device 110, the learner device 108, and/or separately by a third party in communication via the network 114. In addition, the educator device 110 and the learner device 108 may communicate directly with the tutorial generation system 102, bypassing the network 114. Further, the social networking system 116 can be maintained entirely or in part by a third-party server such as a social networking server.

Figure 2:
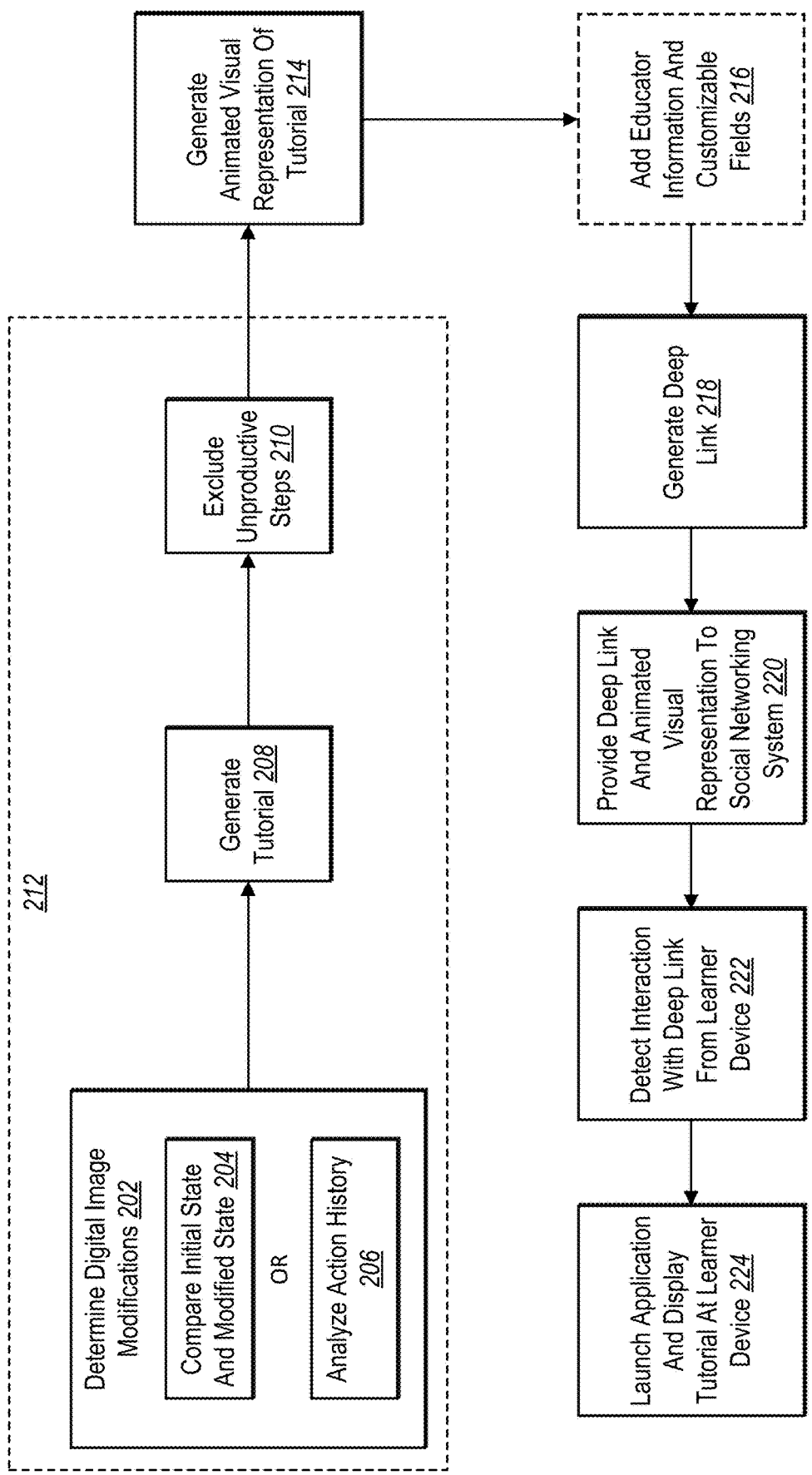
FIG. 2 illustrates an example overview of generating, publishing, and presenting an animated tutorial based on modifications to a digital image in accordance with one or more embodiments.

As mentioned, the tutorial generation system 102 can generate and publish an animated tutorial for modifying a digital image. FIG. 2 illustrates an example series of acts that the tutorial generation system performs to generate and provide an animated tutorial for modifying a digital image within a digital image editing application. The description of FIG. 2 provides an overview of generating and providing an animated tutorial. Thereafter, the description of subsequent figures provides additional detail with regard to the various acts illustrated in FIG. 2. Further, as indicated by the dashed box 212, the description of acts 202-210 and algorithms in relation to FIG. 2 can provide corresponding structure for a step for automatically generating an animated tutorial based on modifications between the initial state and the modified state of the digital image.

As shown, the tutorial generation system 102 performs an act 202 to determine digital image modifications. For example, in some embodiments the tutorial generation system 102 determines digital image modifications based on performing an act 204 to compare an initial state of a digital image with a modified state of a digital image. Indeed, the tutorial generation system 102 compares an initial state of a digital image with a modified state of the digital image by comparing parameters associated with the digital image within a digital image editing system. For example, the tutorial generation system 102 can determine changes to brightness and saturation to various selected portions of a digital image from an initial state to a modified state.

To compare an initial state of a digital image with a modified state of the digital image, in some embodiments, the tutorial generation system 102 can compare metadata information associated with an initial digital image (i.e., the initial state of the digital image) and corresponding information associated with a modified digital image (i.e., the modified state of the digital image). For example, the tutorial generation system 102 captures and stores an initial metadata file of information that describes a digital image in its initial state, and the tutorial generation system 102 further captures and stores a modified metadata file of information that describes the digital image in its modified state.

In some embodiments, the tutorial generation system 102 stores such metadata files of information describing modifications made to digital images in the form of an XMP file type. Thus, in these embodiments, to determine modifications made to a digital image, the tutorial generation system 102 compares an initial XMP file associated with an initial state of the digital image with a modified XMP file associated with a modified state of the digital image. Additional detail regarding comparing an initial state of a digital image with a modified state of a digital image is provided below with reference to FIG. 3 and FIG. 4.

In other embodiments, the tutorial generation system 102 determines digital image modifications (i.e., the act 202) by performing an act 206 to analyze an action history associated with a digital image within a digital image editing application. To elaborate, the tutorial generation system 102 tracks or monitors actions such as inputs or other interactions made within a digital image editing application to modify a digital image. For example, the tutorial generation system 102 identifies user inputs to adjust parameters associated with digital images to change various digital image properties. The tutorial generation system 102 can generate or access a log of these user inputs and utilize this log as an action history. To illustrate, the tutorial generation system 102 can maintain a log of actions within a digital image editing application as part of providing "undo" functionality within the digital image application. The tutorial generation system 102 can store this log of actions and utilize the log as an action history to determine modifications to a digital image.

As illustrated in FIG. 2, the tutorial generation system 102 further performs an act 208 to generate a tutorial. More specifically, the tutorial generation system 102 generates an animated tutorial based on the modifications made to change from an initial state of a digital image to a modified state of the digital image (e.g., as described in relation to the act 204 and/or the act 206). To generate an animated tutorial, the tutorial generation system 102 generates a tutorial document or a tutorial file that includes information recognizable to a digital image editing application (e.g., such that a digital image editing application can execute the tutorial document/file to display or present an animated tutorial via a learner device). The tutorial generation system 102 can generate the tutorial file to include information indicating modifications made to a digital image and to further include information to show a visual animation of making the modifications to the digital image.

In some embodiments, the animated tutorial is platform-independent. For example, a digital image editing application can include different versions (or platforms) for different types of client devices. For example, a digital image editing application can have a first version with a first set of user interfaces and interface elements for desktop computing platform. Similarly, a digital image editing application can have a second version with a second set of user interfaces and interface elements for a mobile computing platform. The tutorial generation system 102 can generate an animated tutorial that is compatible across multiple platforms. For example, the tutorial generation system 102 can generate a tutorial document/file with a particular format (e.g., Portable Tutorial Format or "PTF") that is compatible with a digital image editing application executed by learner devices of a variety of types (e.g., mobile devices or desktop devices). Thus, the animated tutorial can dynamically adjust to illustrate the interface elements for a specific platform (e.g., display the first set of user interfaces and corresponding elements for the desktop computing platform and display the second set of user interfaces and corresponding elements for the mobile computing platform). Additional information regarding generating an animated tutorial as well as the tutorial document/file is provided below with reference to FIG. 5.

As illustrated in FIG. 2, the tutorial generation system 102 further performs an act 210 to exclude unproductive steps from the animated tutorial. In some embodiments, the tutorial generation system 102 prunes or removes particular modifications from an animated tutorial. For example, the tutorial generation system 102 analyzes the modifications made between an initial state and a modified state of a digital image to determine a measure of change associated with each modification. The tutorial generation system 102 further compares the measure of change associated with the individual modifications against a threshold measure of change. Based on determining that the measure of change associated with any particular modification(s) fails to satisfy the threshold measure of change, the tutorial generation system 102 removes the corresponding modifications from the animated tutorial. For example, the tutorial generation system 102 removes the code or information from the tutorial document/file that indicates the corresponding modifications that fail to satisfy the threshold measure of change.

While FIG. 2 illustrates the act 210 after the act 208, in some embodiments the tutorial generation system 102 performs the act 210 before (or as part of) performing the act 208 to generate an animated tutorial. Indeed, rather than removing unproductive (or underproductive) steps or modifications from the animated tutorial, the tutorial generation system 102 determines a measure of change associated with each modification before including the modification as part of the animated tutorial (or as part of a tutorial document/file). Thus, the tutorial generation system 102 can exclude or refrain from adding modifications that fail to satisfy a threshold measure of change from inclusion as part of the animated tutorial. Additional detail regarding the act 210 is provided below with reference to FIG. 6.

As shown, the tutorial generation system 102 further performs an act 214 to generate an animated visual representation of the generated tutorial. For example, the tutorial generation system 102 generates a visual representation of an animated tutorial that is viewable via learner devices within, for example, a social media post or an email. In some embodiments, the tutorial generation system 102 generates a visual representation of an animated tutorial in the form of a GIF to depict the transition from an initial state of a digital image to a modified state of the digital image. For instance, the tutorial generation system 102 generates a before-and-after GIF that slides between viewing the initial state of a digital image to viewing a modified state. In other embodiments, however, the tutorial generation system 102 generates a different type of visual representation such as a brief animation including a number (e.g., 5, 10, or 30) of frames showing changes corresponding to individual modifications of the digital image from an initial state to a modified state. Additional detail regarding generating an animated visual representation of an animated tutorial is provided below with reference to FIG. 7 and FIG. 8.

In some embodiments, the tutorial generation system 102 further performs an act 216 to add educator information and customizable fields to an animated tutorial. To elaborate, in these embodiments, the tutorial generation system 102 provides a selectable option to publish an animated tutorial within a digital image editing interface of a digital image editing application. Upon determining that an educator has selected the option to publish an animated tutorial (e.g., by detecting a selection or by receiving an indication of a selection), the tutorial generation system 102 displays (or causes an educator device to display) a tutorial generation interface.

Within the tutorial generation interface, the tutorial generation system 102 enables an educator operating an educator device to input various information associated with an animated tutorial such as a title, a description, and attributes associated with the visual representation of the animated tutorial (e.g., a type of visual representation such as a GIF or a framewise animation). The tutorial generation system 102 further adds educator information such as a name associated with an educator profile and a profile picture associated with the educator profile. In some embodiments, based on input received via the tutorial generation interface, the tutorial generation system 102 modifies an animated tutorial by, for example, removing one or more steps or actions and/or changing a sequence or order of the steps in the tutorial. In the same or other embodiments, the tutorial generation system 102 includes interface elements such as a speaker button selectable to record audio instructions that describe all or part of an animated tutorial and for including with an animated tutorial. Additional detail regarding adding educator information and customizable fields is provided below with reference to FIG. 7.

As mentioned, the tutorial generation system 102 can generate a deep link. Indeed, as illustrated in FIG. 2, the tutorial generation system 102 performs an act 218 to generate a deep link to include with a social media message. For instance, the tutorial generation system 102 generates a deep link that includes a reference to the animated tutorial and the digital image editing application. By including the references to the animated tutorial and the digital image editing application, the deep link causes a learner device to perform specific functions based on a selection of the deep link. In response to detecting a learner selection of the deep link, the tutorial generation system 102 causes the learner device to execute the digital image editing application and present the animated tutorial within the digital image editing application.

In cases where a learner device does not already include the corresponding digital image editing application, the tutorial generation system 102 causes the learner device to download and install the digital image editing application. For example, the tutorial generation system 0102 execute an application store application and present an option to install the digital image editing application on the learner device. In some embodiments, based on a selection of a deep link, the tutorial generation system 102 identifies a compatible digital image editing application that may be the same application utilized by the educator device to generate the animated tutorial or that may be a different application (e.g., a different application that is capable of playing the animated tutorial). Additional detail regarding deep links is provided below with reference to FIG. 8.

As further illustrated in FIG. 2, the tutorial generation system 102 performs an act 220 to provide the generated deep link and an animated visual representation of the animated tutorial to a social networking system (e.g., the social networking system 116). More particularly, the tutorial generation system 102 provides the deep link together with the animated visual representation of the animated tutorial as well as educator information and any customized fields to learner devices for display. For example, based on a selection via an educator device to publish an animated tutorial, the tutorial generation system 102 can generate and provide a social media post to a social networking system which posts the deep link, the visual representation, and the additional information. Indeed, the tutorial generation system 102 generates a social media message that is sharable as a social media post, email, or text message and that includes the educator information, the custom information, the animated visual representation of the animated tutorial, and/or the deep link. Thus, by providing the social media message to a social networking system, the tutorial generation system 102 enables learner devices to interact with the social media message to, for example, select the deep link to view the animated tutorial.

Further from FIG. 2, the tutorial generation system 102 performs an act 222 to detect an interaction with the deep link from a learner device. More particularly, the tutorial generation system 102 detects, or receives an indication of, a selection of a deep link within a social media message. Based on the selection of the deep link, the tutorial generation system 102 presents or causes the learner device 108 to present or display the animated tutorial. To present the animated tutorial, the tutorial generation system 102 performs an act 224 to launch or cause the launch of a digital image editing application (e.g., the digital image editing application 112). Indeed, the deep link includes a reference to the digital image editing application utilized by the educator device 110 to modify a digital image. Thus, the tutorial generation system 102 causes the learner device 108 to launch the same digital image editing application 112. In some embodiments, however, the deep link further includes information to launch other applications (e.g., applications capable of presenting PTF tutorials) based on determining that the learner device 108 does not have installed the same digital image editing application 112 used to generate a modified digital image.

In addition, the tutorial generation system 102 presents the animated tutorial within the digital image editing application 112. As mentioned, the deep link includes a reference to the animated tutorial (which the tutorial generation system 102 stores in a repository upon generation) to cause the learner device 108 to open and present the animated tutorial within the launched application (e.g., the digital image editing application or other compatible application).

To perform the act 224, the tutorial generation system 102 registers a deep link handler to enable invoking the display of particular interfaces on a given device (e.g., the learner device 108) upon selection of a deep link. Utilizing the handler based on selection of a deep link, the tutorial generation system 102 extracts a unique identifier associated with an animated tutorial stored within a repository and downloads (or causes the learner device 108 to download) a corresponding tutorial file along with the corresponding visual representation 804 of the animated tutorial. Once the animated tutorial is downloaded and available, the tutorial generation system 102 passes the tutorial file to a tutorial engine of a digital image editing application. The tutorial engine of the digital image editing application reads and executes the code of the tutorial file to present the animated tutorial. For example, the tutorial engine generates a step-by-step walkthrough of a sequence of user interfaces that each depict a separate step of the animated tutorial.

Figure 3:
FIG. 3 illustrates an example initial digital image and an example modified digital image in accordance with one or more embodiments.
Figure 3:

As mentioned, the tutorial generation system 102 can generate an animated tutorial that depicts steps or instructions on how to modify parameters associated with a digital image within a digital image editing application. FIG. 3 illustrates an example initial digital image 302 (i.e., an initial state of a digital image) and an example modified digital image 304 (i.e., a modified state of a digital image) that the tutorial generation system 102 can utilize to generate an animated tutorial. In particular, the tutorial generation system 102 determines modifications made to the digital image to transition from the initial digital image 302 to the modified digital image 304.

In some embodiments, an educator device edits the initial digital image 302 to create the modified digital image 304 by modifying various parameters within a digital image editing application. Thus, the tutorial generation system 102 determines the modifications made to the initial digital image 302 to generate the animated tutorial that includes visual representations of the acts (e.g., modifications to particular user interface elements and/or edit settings) that the educator took to modify specific parameters to generate the modified digital image 304.

As mentioned, the tutorial generation system 102 can determine modifications made to the initial digital image 302 to arrive at the modified digital image 304. In some embodiments, the tutorial generation system 102 determines such modifications based on comparing the initial digital image 302 with the modified digital image 304. For example, the tutorial generation system 102 determines initial information such as initial metadata that describes the parameters associated with the initial digital image 302 and further determines modified information such as modified metadata associated that describes the parameters associated with the modified digital image 304. Additionally, the tutorial generation system 102 compares the initial information with the modified information to determine the modifications made to the various parameters.

To this point, FIG. 4 illustrates an example of initial digital image information 400 associated with the initial digital image 302 and modified digital image information 402 associated with the modified digital image 304. More specifically, the initial digital image information 400 and the modified digital image information 402 can be XMP files that define various parameters associated with the initial digital image 302 and the modified digital image 304, respectively. As shown, the initial digital image information 400 indicates parameters associated with the initial digital image 302 such as a temperature with a parameter value of 2000, a tint with a value of +30, a saturation with a value of 0, a sharpness with a value of 50, a luminance smoothing with a value of 15, and an exposure with a value of +0.50.

As also shown, the modified digital image information 402 indicates parameters associated with the modified digital image 304 such as a temperature with a parameter value of 2605, a tint with a value of +50, a saturation with a value of 0, a sharpness with a value of 40, a luminance smoothing with a value of 26, and an exposure with a value of +0.88. To determine modifications made to the initial digital image 302, the tutorial generation system 102 compares the modified digital image information 402 with initial the digital image information 400. For example, an XMP file associated with the initial digital image 302 can indicate parameter values that differ from an XMP file of the modified digital image 304. Indeed, as illustrated in FIG. 4, the tutorial generation system 102 determines modifications such as a modification of the temperature parameter from 2000 to 2605, a modification of the tint parameter from +30 to +50, a modification of the sharpness parameter from 50 to 40, a modification of the luminance smoothing parameter from 15 to 26, and a modification of the exposure parameter from +0.50 to +0.88. These parameter differences are merely illustrative, and other differences in parameters are possible.

In some embodiments, the tutorial generation system 102 determines modifications made to the initial digital image 302 to create the modified digital image 304 based on analyzing an action history associated with a digital image editing application. To elaborate, the tutorial generation system 102 monitors actions that an educator takes within a digital image editing application. For example, the tutorial generation system 102 detects user interactions with various interface elements and determines modifications made to parameters as the educator goes about the process of modifying a digital image (e.g., the initial digital image 302). In some embodiments, the tutorial generation system 102 also tracks the order of the modifications made to the various parameters within the digital image editing application (e.g., by adding the modifications to a que in the order they are performed and/or timestamping the various parameter modifications). Based on analyzing the action history in this manner, the tutorial generation system 102 generates an animated tutorial that includes visual representations of the modifications to the various parameters made by the educator within the digital image editing application.

As mentioned, the tutorial generation system 102 can generate an animated tutorial based on determining modifications made to a digital image. For example, based on determining modifications made to the initial digital image 302 to generate the modified digital image 304, the tutorial generation system 102 generates a tutorial document or a tutorial file that, when read and executed by a digital image editing application, causes a device (e.g., a learner device) to display an animated tutorial that depicts visual representations of various actions that a learner can take within the digital image editing application to replicate the same modifications. FIG. 5 illustrates an example tutorial file 502 that the tutorial generation system 102 generates based on determining modifications associated with the modified digital image 304.

For example, the tutorial file 502 includes code that causes a digital image editing application to visually portray how to make edits to a digital image (e.g., the initial digital image 302 or a different digital image selected by a learner operating a learner device) to match the modified digital image 304. As shown, the tutorial file 502 includes code for visually presenting various information such as a title ("A Few Easy Edits To Enhance Your Photos"), a description of the animated tutorial ("Learn How to Edit Photos With Just a Few Clicks"), and names for steps within the animated tutorial ("Let's begin by adjusting the lighting"). In addition, the tutorial file 502 includes code for instructing and showing adjustments of an exposure parameter—code to display the text "Change the exposure as indicated to make the photo brighter or darker" as well as code to show how to adjust an interface element for adjusting exposure to the value of +0.88. Indeed, in some embodiments the tutorial generation system 102 generates text-based descriptions or explanations of modifications to include as part of the animated tutorial. For instance, the tutorial generation system 102 determines which parameters are adjusted and how, and the tutorial generation system 102 generates a text-based description of the modifications to explain to a learner how to make those modifications themselves. Thus, based on executing the tutorial file 502, the tutorial generation system 102 presents visual representations of how to modify a digital image along with text-based descriptions to guide a learner through the modifications in a step-by-step, hands-on manner.

In addition to code for modifying exposure, the tutorial file 502 can include code for showing other modifications to parameters such as shadows, temperature, tint, saturation, sharpness, color noise reduction, and luminance smoothing. Indeed, the tutorial file 502 includes code to present interface elements for adjusting the various parameters such as a slider to adjust the exposure parameter, a slider to adjust the shadows parameter, and a slider to adjust color noise reduction. To generate the code within the tutorial file 502 that indicates how to make various edits to a digital image, the tutorial generation system 102 utilizes the identified parameter modifications described above. For example, the tutorial generation system 102 performs the above-described comparison of the initial digital information 400 and the modified digital image information 402 and/or analyzes an action history to determine modifications. Based on determining the differences in parameters before and after such modifications, the tutorial generation system 102 generates code for the tutorial file 502 for executing and illustrating the modifications. For instance, the tutorial generation system 102 generates code that causes a visual portrayal of a change of a temperature parameter from 2000 to 2605, a tint parameter from +30 to +50, and a change of an exposure parameter from +0.50 to +0.88 (among others). Indeed, the tutorial generation system 102 identifies changes in parameters and generates corresponding code (e.g., in PTF format) that, when executed, causes such parameter changes within a digital image editing application on a device.

As mentioned, upon a learner device selecting a deep link to execute a digital image editing application to present an animated tutorial, the tutorial generation system 102 causes the learner device to read and execute the tutorial file 502 to present the animated tutorial. Thus, the tutorial generation system 102 generates the animated tutorial from the tutorial file 502—e.g., the tutorial generation system 102 generates a sequence of visual portrayals of modifications made to a digital image based on code executed from the tutorial file 502. Indeed, a digital image editing application includes logic to show/play the animated tutorial within a digital image editing interface. For example, the tutorial generation system 102 loads a template and then injects the specific parameter modifications in the loaded template. As a result, the tutorial generation system 102 generates and presents an animated tutorial that includes individual steps for each edit or modification made to the parameters indicated in the modified digital image information 402 (e.g., the XMP file) and/or indicated based on an action history.

As opposed to conventional systems that provide tutorials via recorded digital video, the tutorial generation system 102 can generate animated tutorials based on tutorial files (e.g., the tutorial file 502) that include lists of modifications. Thus, rather than playing digital video that illustrates specific interface elements within a particular recorded user interface, the tutorial generation system 102 generates animated tutorials that are adaptive across different types of devices for different device-specific user interfaces. For example, the tutorial generation system 102 generates the tutorial file 502 which is compatible with digital image editing applications executed on mobile devices as well as desktop devices. Upon implementation of the tutorial file 502, the tutorial file 502 causes a mobile device and/or a desktop device to display interface elements based on the platform of the device—e.g., to fit different screen dimensions and/or accommodate different types of input such as touch input, mouse input, or keyboard input. For instance, the tutorial file 502 causes a mobile device to display, as part of the animated tutorial, user interface elements having particular locations and sizes that make sense with the dimensions of the mobile device and that are responsive to touch input. For desktop devices, on the other hand, the tutorial file 502 causes a device to display the animated tutorial within a user interface having particular desktop-specific dimensions and including interface elements sized that are located appropriately for desktop devices and responsive to keyboard and/or mouse input.

Figure 6:
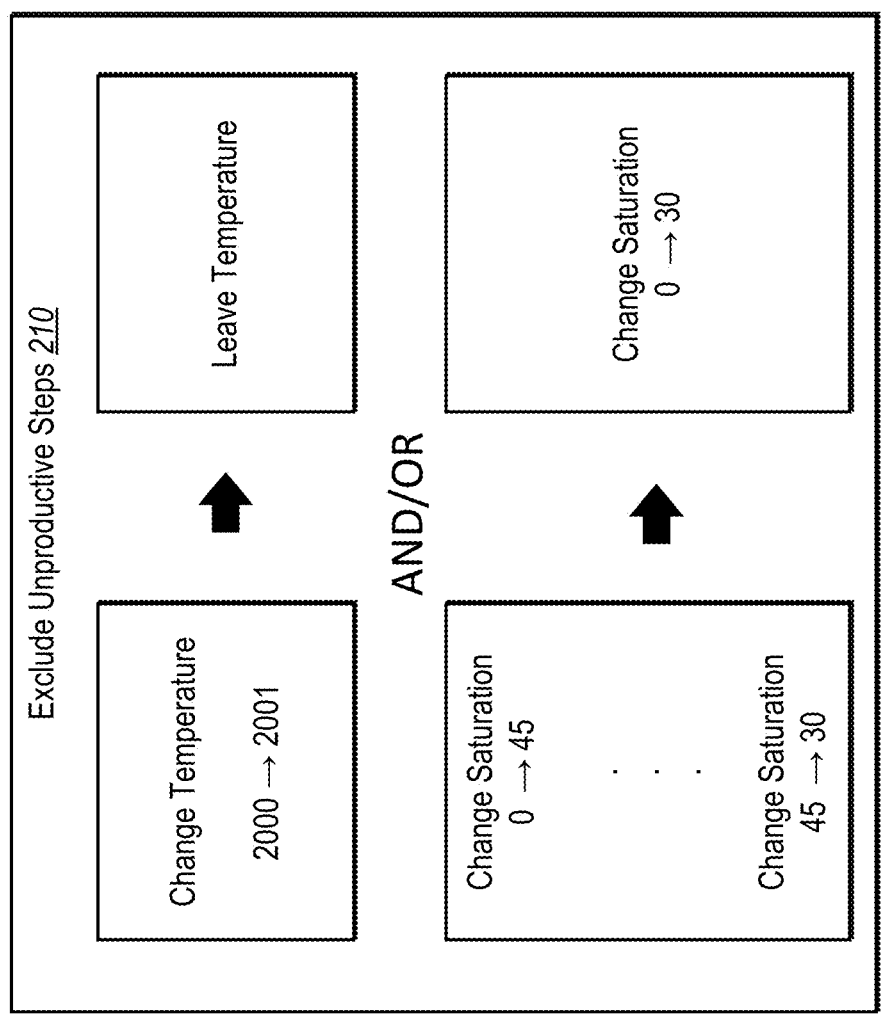
FIG. 6 illustrates an example process of excluding steps from an animated tutorial in accordance with one or more embodiments.

As mentioned, the tutorial generation system 102 can remove steps or modifications from an animated tutorial based on a measure of change associated with the modifications. Indeed, FIG. 6 illustrates an example of excluding a particular modification based on determining that a measure of change associated with the modification fails to satisfy a threshold measure of change. FIG. 6 also illustrates an example of excluding a particular modification based on determining that two modifications are combinable. As shown, the tutorial generation system 102 performs the act 210 to exclude the modification of the temperature parameter from 2000 to 2001 because the change fails to satisfy a threshold measure of change.

In some embodiments, the tutorial generation system 102 can perform the act 210 to also (or alternatively) condense the two saturation changes to one step instead of two. For instance, the tutorial generation system 102 determines that the change of the saturation parameter from a value of 0 to a value of 45 and a subsequent change of the same saturation parameter from 45 to a value of 30 is the same as a single change in the saturation parameter from 0 to 30. In some embodiments, the tutorial generation system 102 identifies redundant modifications, combinable modifications (e.g., as shown in the saturation example of FIG. 6), and/or net-zero modifications (e.g., where one modification undoes or performs the opposite function of another modification such as changing saturation from 0 to 10 and then back to 0) to remove or exclude from an animated tutorial.

Indeed, the tutorial generation system 102 analyzes the modifications made to a digital image (e.g., the initial digital image 302) to determine a measure of change associated with each modification. In particular, the tutorial generation system 102 determines a difference between parameter values of an initial state and a modified state. In addition, the tutorial generation system 102 determines whether the measure of change of a particular modification satisfies a threshold measure of change (e.g., an epsilon). Based on determining that a measure of change for a particular modification fails to satisfy the threshold, the tutorial generation system 102 determines to remove or otherwise exclude the particular modification. In some embodiments, the epsilon of a given parameter can be different than epsilons associated with other parameters, depending on the respective sensitivities of the parameters.

In some embodiments, the tutorial generation system 102 further determines modifications that make an animated tutorial unnecessarily lengthy. For example, the tutorial generation system 102 identifies those modifications that are combinable, redundant, or result in a net-zero change. Indeed, as shown in FIG. 6, the tutorial generation system 102 combines the two saturation modifications into a single step. Similarly, in some embodiments, the tutorial generation system 102 identifies net-zero modifications such as a first modification to change saturation from 0 to 10 and a second modification to change the saturation from 10 to 0. The tutorial generation system 102 can identify and remove or exclude these limitations as part of the act 210.

In one or more embodiments, the tutorial generation system 102 performs the act 210 to remove steps from a generated animated tutorial. In other embodiments however, the tutorial generation system 102 performs the act 210 to exclude unproductive (or underproductive) steps preemptively—before (or as part of) generating an animated tutorial. In particular, the tutorial generation system 102 identifies modifications to exclude or otherwise refrain from including within a tutorial file (e.g., the tutorial file 502) during the process of generating the tutorial file. By utilizing the measure of change to exclude particular modifications as described, the tutorial generation system 102 improves the efficiency of animated tutorials by removing unnecessary, unproductive, or underproductive steps.

Figure 7:
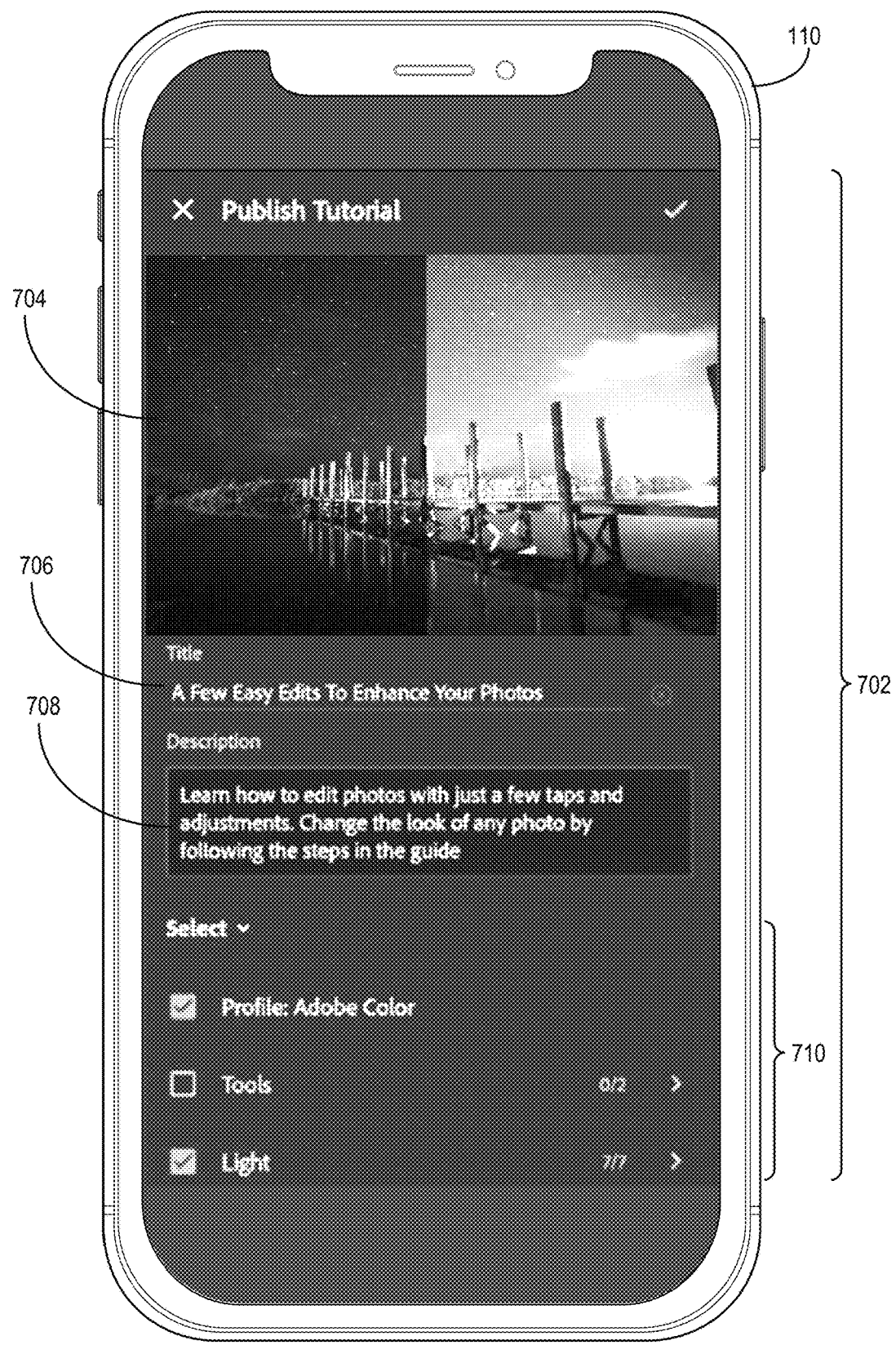
FIG. 7 illustrates an example tutorial generation interface displayed on an educator device for generating and/or publishing an animated tutorial in accordance with one or more embodiments.

As mentioned, the tutorial generation system 102 can provide or display an option via an educator device to publish an animated tutorial. Indeed, FIG. 7 illustrates an example tutorial generation interface 702 displayed on the educator device 110. As shown, the tutorial generation interface 702 includes an animated visual representation 704 of the animated tutorial along with customizable fields such as a title field 706, a description field 708, and various presentation options 710 including display color options. The tutorial generation system 102 provides the tutorial generation interface 702 via the educator device 110 for generating and/or modifying an animated tutorial. In some embodiments, the tutorial generation system 102 provides the tutorial generation interface 702 in response to detecting (or receiving an indication of) a selection of a publish option within a digital image editing interface of a digital image editing application. Indeed, the educator device 110 displays the tutorial generation interface 702 within a digital image editing application.

As illustrated in FIG. 7, the tutorial generation interface 702 includes an animated visual representation 704 of an animated tutorial. As discussed, the animated visual representation can include a GIF that shows a before portion (e.g., on the left side or the right side) that reflects the initial digital image 302 and an after portion (e.g., on a side opposite the before portion) that reflects the modified digital image 304. The GIF can be animated such that, when played, the divider between the before portion and the after portion starts at an initial position (e.g., at the left side of the tutorial generation interface 702 or 20% from the left side of the tutorial generation interface 702) and moves across the screen to the right to a final position (e.g., at the right side of the tutorial generation interface 702 or 80% from the left side of the tutorial generation interface 702). As the divider moves, the animated visual representation 704 reveals the modified state of the digital image. In some embodiments, the divider between the before portion and the after portion can be movable such that a learner operating a learner device viewing the visual representation 704 as part of a social media post can slide the divider left and right to see the transformation of the digital image.

In addition, the tutorial generation interface 702 includes a title field 706, a description field 708, and presentation options 710 that are modifiable via the educator device 110. For instance, in some embodiments the tutorial generation system 102 receives or detects input from an educator device to enter information in the title field 706, the description field 708, and/or the presentation options 710. In these or other embodiments, the tutorial generation system 102 receives or detects an indication to publish the animated tutorial, whereupon the tutorial generation system 102 generates a social media message that includes the information shown within the tutorial generation interface 702 such as the animated visual representation 704, the title field 706, the description field 708, and the presentation options 710. In addition, the tutorial generation system 102 includes educator information as part of the social media message along with a deep link that is selectable and that includes a reference to the animated tutorial and a digital image editing application.

As part of generating or modifying an animated tutorial using the tutorial generation interface 702, the tutorial generation system 102 can provide interface elements for performing additional tasks in relation to an animated tutorial. For example, in some embodiments the tutorial generation system 102 displays an interface element such as a speaker button selectable to record audio instructions to explain one or more steps of the animated tutorial. In the same or other embodiments, the tutorial generation system 102 provides an option to change the order of acts within an animated tutorial (e.g., by clicking and dragging indicators for acts to order them as desired). In these or other embodiments, the tutorial generation system 102 provides, via the tutorial generation interface 702, an option to add or remove acts from an animated tutorial. Upon detecting a change to the order of one or more acts (and/or an addition or removal of acts), the tutorial generation system 102 modifies code within a tutorial file for the animated tutorial such that the order in which a device executes the code to present the animated tutorial from the tutorial file is in the same order as indicated via the tutorial generation interface 702.

Figure 8:
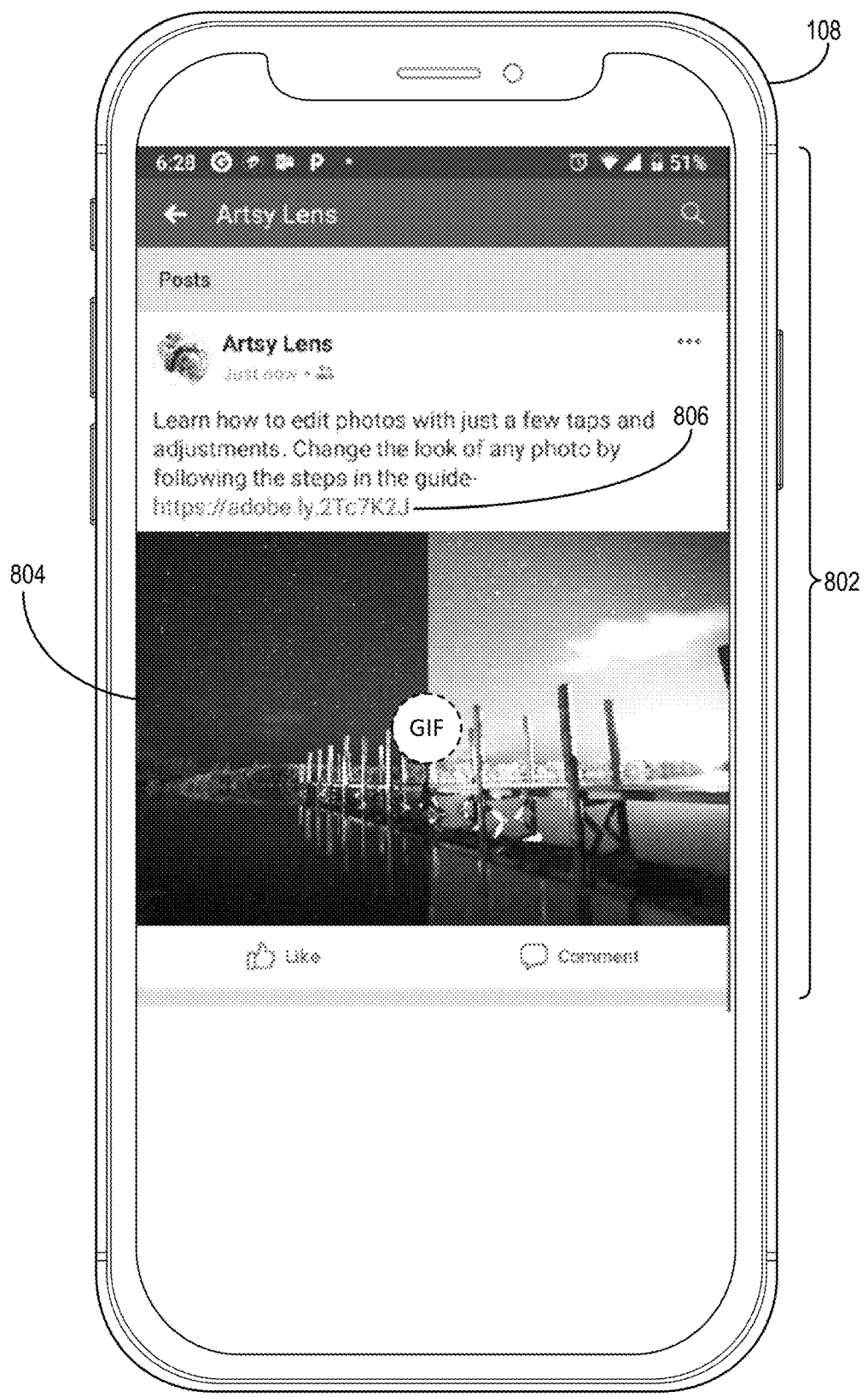
FIG. 8 illustrates an example social media message including a visual representation of an animated tutorial as displayed on a learner device in accordance with one or more embodiments.

As mentioned, the tutorial generation system 102 can provide a deep link as part of social media message based on an indication to publish an animated tutorial. Indeed, FIG. 8 illustrates an example social media message 802 displayed on the learner device 108 in the form of a social media post. As shown, the tutorial generation system 102 provides the social media message 802 including a title, a description, a deep link 806, and an animated visual representation 804 (e.g., the animated visual representation 704) of the animated tutorial referenced by the deep link 806. In some embodiments, the tutorial generation system 102 provides the social media message 802 to a social networking system. To illustrate, the tutorial generation system 102 can call a particular social media platform API for publishing to a social media site (e.g., publish to an educator's wall such that the social media message 802 appears on a social media feed of learner devices). For example, the tutorial generation system 102 can cause the educator device 110 to provide the social media message 802 to a social networking system or, in some embodiments, the tutorial generation system 102 can cause the server(s) 104 to provide the social media message 802 to a social networking system. In other embodiments, however, the tutorial generation system 102 provides the social media message 802 via a text message or an email.

As shown in FIG. 8, the learner device 108 displays the social media message 802 including the animated visual representation 804 and the deep link 806. In particular, the animated visual representation 804 is an animated GIF that illustrates the difference between an initial state of a digital image and a modified state of the digital image. In some embodiments, the animated visual representation 804 automatically plays as part of viewing the social media message 802 (e.g., plays in a loop to repeatedly show the modifications of the digital image). For instance, the animated visual representation 804 is animated such that the divider line between the initial state and the modified state slides from an initial position (e.g., at a left border or 20% from the left border) where the initial state of the digital image is predominately viewable to a final position (e.g., at a right border or 80% from the left border) where the modified state of the digital image is predominately viewable. In other embodiments, the animated visual representation 804 is selectable to play the GIF to show the differences between initial and modified states. In still other embodiments, the animated visual representation 804 is interactive to show the differences between an initial digital image and a modified digital image, where the divider is selectable and slidable via the learner device 108.

Additionally, the social media message 802 includes the deep link 806. Particularly, the deep link 806 is interactive and selectable such that, upon selection, the tutorial generation system 102 causes the learner device 108 to open or execute a digital image editing application referenced by the deep link 806 (or a digital image editing application capable of playing a PTF tutorial) and to play the animated tutorial also referenced by the deep link 806, as described above in relation to FIG. 2.

Figure 9A:
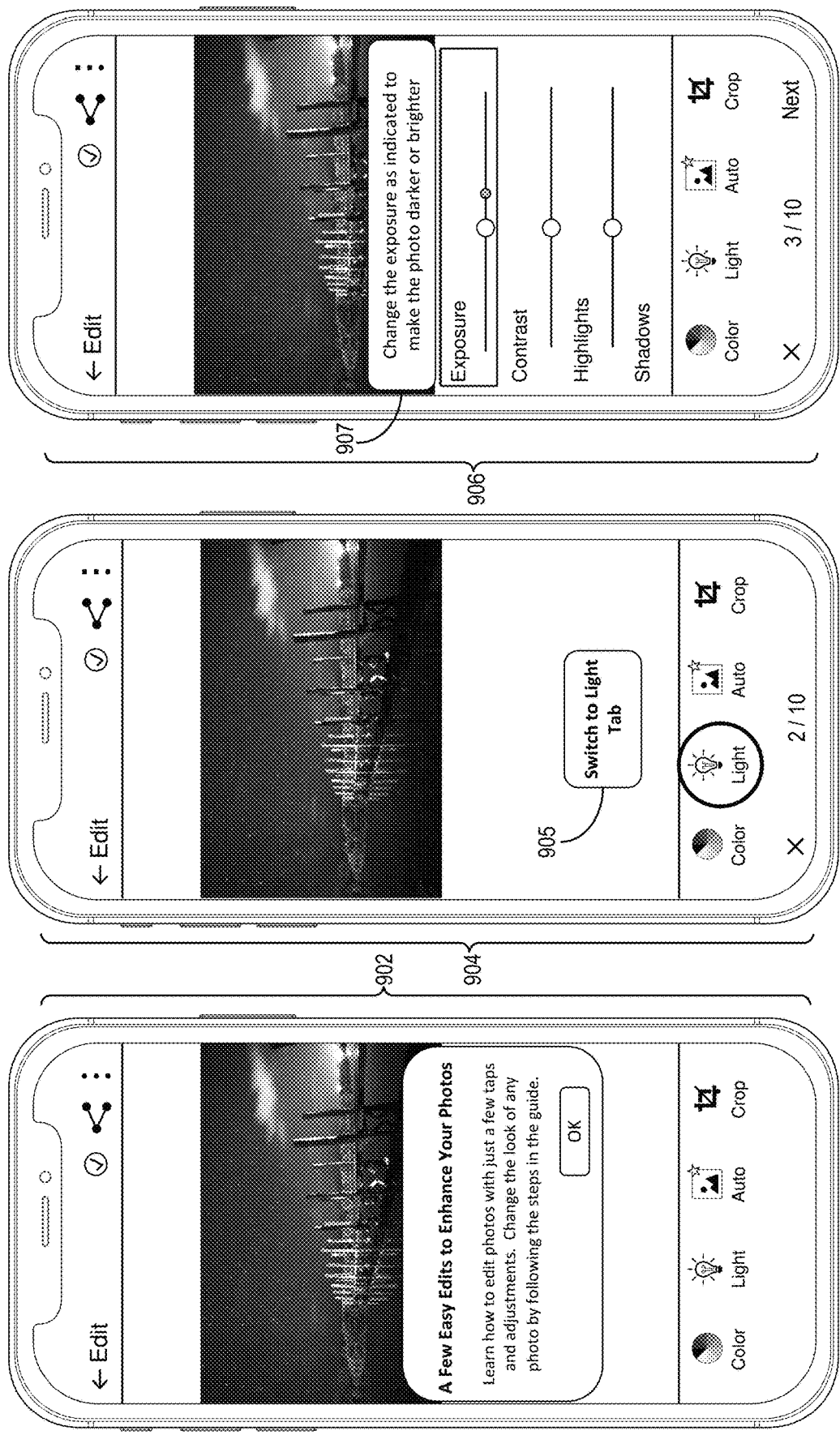
FIGS. 9A and 9B illustrate a user interface portraying an animated tutorial in accordance with one or more embodiments.
Figure 9B:
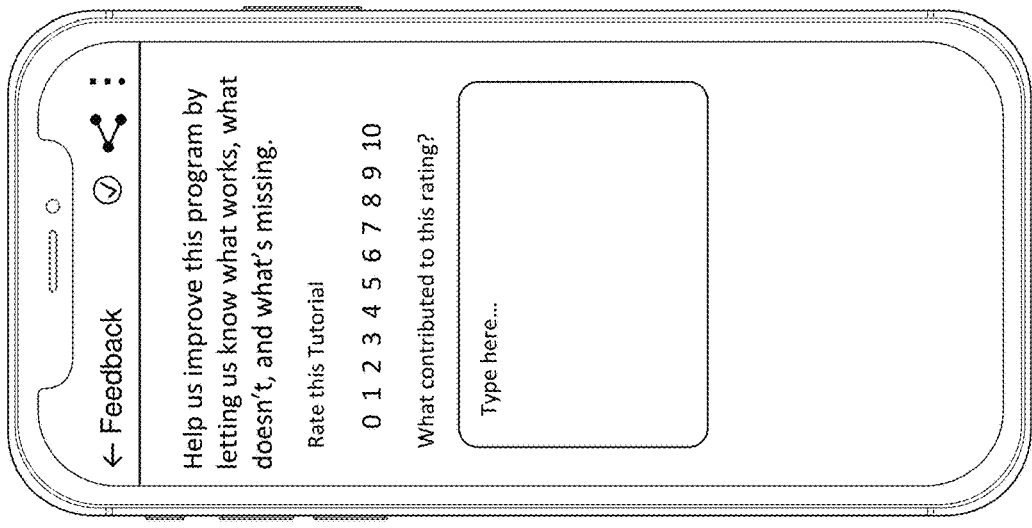
Figure 9B:
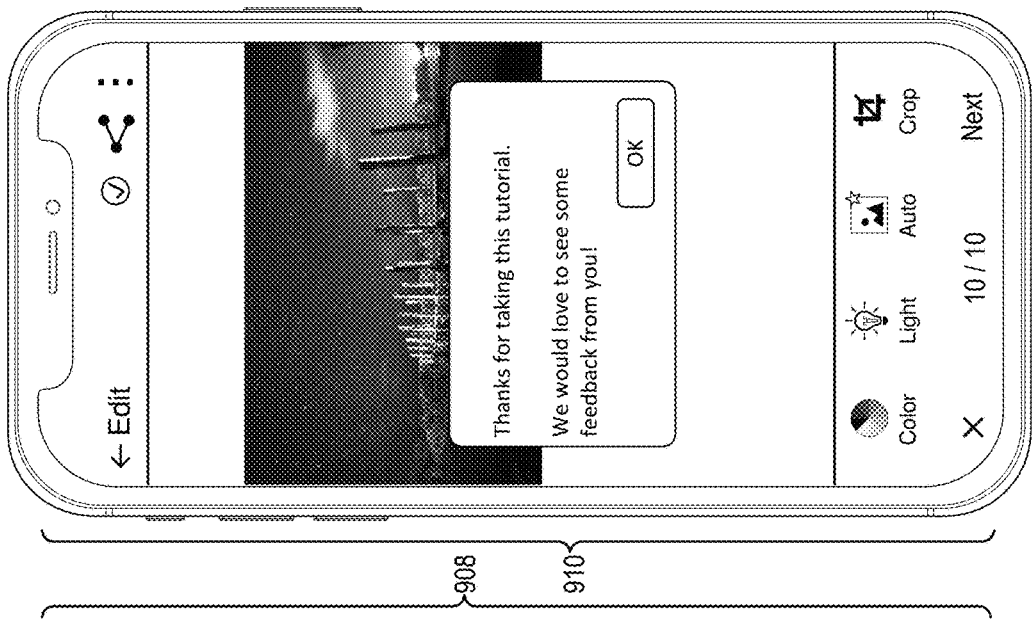
Figure 9B:
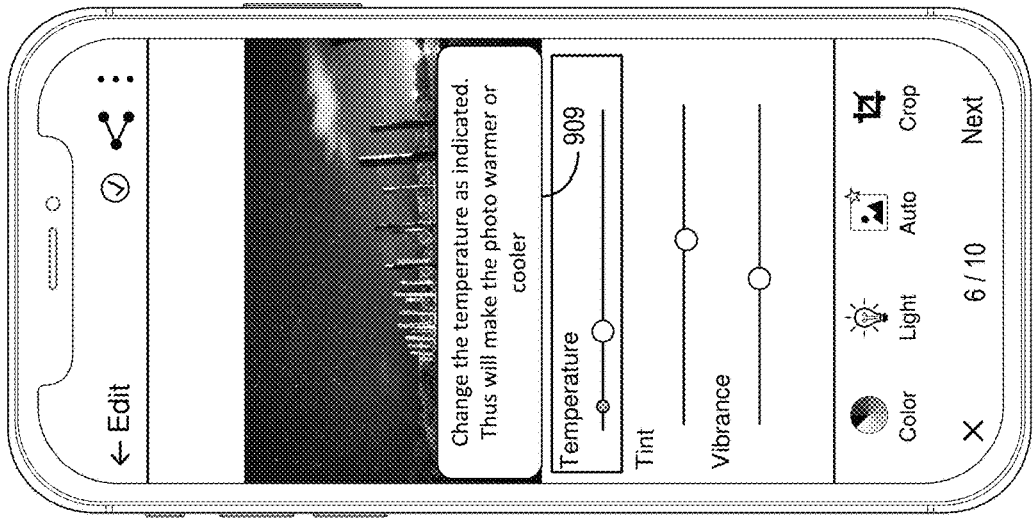

As mentioned, the tutorial generation system 102 causes the learner device 108 to present an animated tutorial based on a selection of a deep link. For example, FIGS. 9A and 9B depict a user interfaces for displaying an animated tutorial via the learner device 108 upon selection of a deep link in accordance with one or more embodiments. In some embodiments, the user interfaces illustrated in FIGS. 9A-9B can also be displayed at an educator device to preview the tutorial before (or as part of) publishing.

As shown, FIG. 9A includes a user interface 902 that includes an introduction to the animated tutorial. For instance, the user interface 902 displays an introductory message and an "OK" button selectable to proceed with the animated tutorial. In some embodiments, the tutorial generation system 102 may not necessarily generate an introductory message such as the one included in the user interface 902 but may instead display the tutorial (e.g., by showing the user interface 904). Further, the user interface 904 includes a visual representation of a second step of an animated tutorial for modifying the digital image. Indeed, the user interface 904 presents a text bubble 905 and circles a nearby interface element to instruct the user to "Switch to the Light tab" by selecting the circled interface element. In some embodiments, the tutorial generation system 102 places the text bubble 905 to be nearby a corresponding interface element by first determining which interface element relates to the action described in the text bubble 905. As shown, the user interface 904 further includes a counter at the bottom indicating that the device is currently displaying step 2 of 10 for the given animated tutorial.

As the animated tutorial progresses, the tutorial generation system 102 further causes the device (e.g., the educator device 110 or the learner device 108) to present the user interface 906. In some embodiments, the animated tutorial is interactive and progresses forward from act to act based on detecting (or receiving an indication of) a selection of the circled "Light" user interface element within the digital image editing application. In other embodiments, the animated tutorial progresses in a time-based manner like an animation where the transitions between user interfaces (e.g., from user interface 904 to 906 occur in sequence irrespective of user input). In these or other embodiments, the user interface 906 includes a presentation of a third step of the animated tutorial. As shown, the user interface 906 includes the light tab with various adjustable parameter sliders. In addition, the user interface 906 includes a text bubble 907 prompting the learner to "Change the exposure as indicated to make the photo darker or brighter."

As part of the animated tutorial, the user interface 906 also includes a highlight or emphasis box around the Exposure slider as well as a dot (e.g., a colored dot or other visual indicator along the slider element of a different color than the interactive dot that is slidable to adjust the corresponding parameter) along the slider indicating where the learner should adjust the exposure parameter from its current middle position. However, in some embodiments the tutorial generation system 102 does not necessarily require the learner to adjust the exposure to the value indicated by the indicator dot. Indeed, in one or more embodiments the various parameters (e.g., "Exposure," "Contrast," "Highlights," and "Shadows") shown within the user interface are interactive as they would normally be within the digital image editing application. In these or other embodiments and based on detecting a selection of the "Next" option within the user interface 906 (and not necessarily dependent on the values of the illustrated parameters), the tutorial generation system 102 causes the learner device to transition to display a subsequent step (e.g., step 4 of 10) of the animated tutorial. In some embodiments, however, the tutorial generation system 102 determines whether the learner has interacted with the interface elements to adjust the parameters as indicated before proceeding to subsequent steps of the animated tutorial.

As shown in FIG. 9B, the user interface 908 displays step 6 of 10 of the animated tutorial. In particular, the user interface 908 includes a text bubble 909 that prompts the learner to "Change the temperature as indicated. This will make the photo warmer or cooler." The user interface 908 further illustrates a color tab open within the digital image editing application and a highlight or emphasis box around the "Temp" interface element for adjusting the temperature parameter. Additionally, the user interface 908 includes a visual indicator (e.g., a dot of a different color than the dot of the interface element) along the temperature slider interface element that indicates a temperature parameter value as a target for the learner. As above with the user interface 906, the user interface 908 also includes a "Next" button for proceeding to the next step of the animated tutorial.

As further shown in FIG. 9B, the user interface 910 depicts step 10 of 10 of the animated tutorial. Particularly, the user interface 910 includes a thank-you message upon completion of the animated tutorial and also includes a request for feedback about the animated tutorial. In user interface 910 further includes an "OK" button selectable to proceed to a feedback interface as illustrated in the user interface 912. In some embodiments, the animated tutorial does not include a request for feedback or a feedback interface.

In one or more embodiments, the tutorial generation system 102 can enable a learner device (e.g., the learner device 108) to modify a different digital image than the digital image shown within an animated tutorial. More particularly, the tutorial generation system 102 enables the learner device 108 to load a custom digital image and follow the animated tutorial while displaying and applying the modifications depicted by the animated tutorial to the custom digital image. Thus, rather than requiring the learner device 108 to display the digital image modified by the educator device 110 in generating the animated tutorial, the tutorial generation system 102 flexibly allows the learner device 108 to apply the animated tutorial (and the modifications therein) to different digital images.

As shown, FIG. 9B further illustrates a user interface 912 that includes a feedback interface. In some embodiments, the feedback interface is be part of the animated tutorial, while in other embodiments the tutorial generation system 102 presents the feedback interface after the end of the animated tutorial. As shown, the user interface 912 includes interactive feedback options by which a learner can provide feedback in relation to an animated tutorial. For example, the user interface includes a rating option (e.g., an option to select a number from 0 to 10 or some other ranking option), a dropdown menu to select a reason for selecting a rating, and a text box for entering other comments or feedback.

Figure 10:
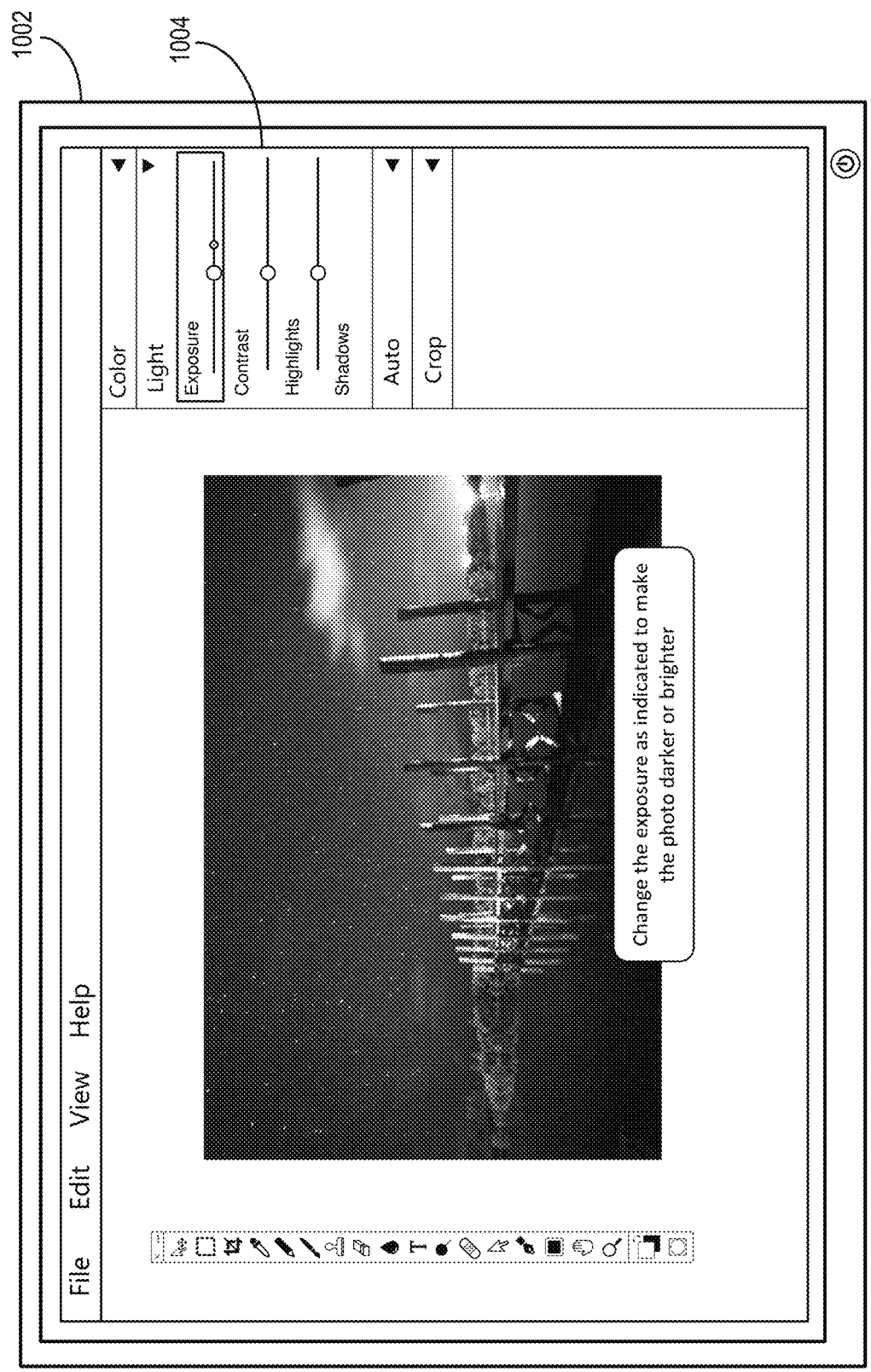
FIG. 10 illustrates an example desktop learner device in accordance with one or more embodiments.

As mentioned, the tutorial generation system 102 can generate animated tutorials that are compatible across multiple platforms of device types. For example, FIG. 10 illustrates a learner device 1002 in the form of a desktop computer. As shown, the learner device 1002 plays the animated tutorial (e.g., by executing a tutorial file via a digital image editing application) to illustrate a step within the animated tutorial. In presenting the animated tutorial, the learner device 1002 displays the user interface 1004 having a different layout than the user interface 906 of FIG. 9A. Indeed, whereas the mobile learner device of FIG. 9A presents interface elements such as selectable options and slider bars in particular locations suitable for operating a mobile device, the learner device 1002 presents interface elements for performing the same functions in different locations more suitable for operating a desktop computer. For example, the learner device 1002 presents interface elements for adjusting exposure, contrast, and other parameters in a location adjacent the digital image to accommodate the screen dimensions of a desktop computer. Thus, the tutorial generation system 102 can generate a dynamic animated tutorial that flexibly adjusts to different user interfaces, different user interfaces elements, and different modifications corresponding to different platforms.

Figure 11:
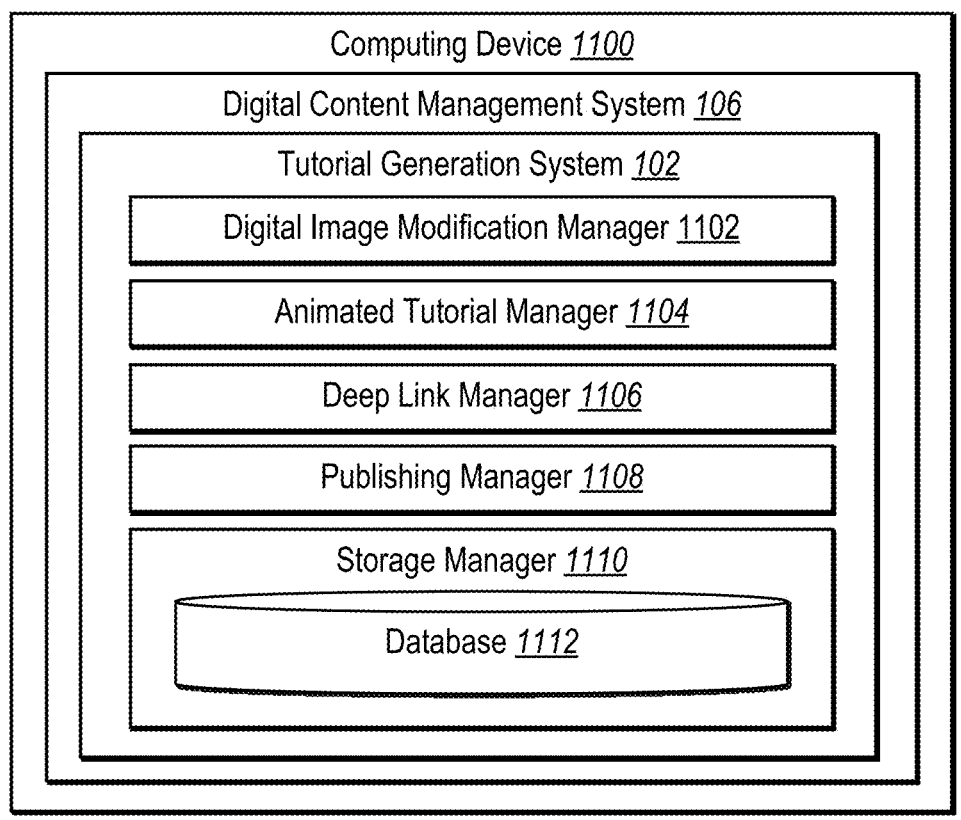
FIG. 11 illustrates a schematic diagram of a tutorial generation system in accordance with one or more embodiments.

Looking now to FIG. 11, additional detail will be provided regarding components and capabilities of the tutorial generation system 102. Specifically, FIG. 11 illustrates an example schematic diagram of the tutorial generation system 102 on an example computing device 1100 (e.g., one or more of the learner device 108, the educator device 110, and/or the server(s) 104). As shown in FIG. 11, the tutorial generation system 102 may include a digital image modification manager 1102, an animated tutorial manager 1104, a deep link manager 1106, a publishing manager 1108, and a storage manager 1110.

As just mentioned, the tutorial generation system 102 includes a digital image modification manager 1102. In particular, the digital image modification manager 1102 monitors, determines, detects, tracks, or otherwise identifies modifications made to digital images. For example, the digital image modification manager 1102 compares an initial digital image with a modified digital image as described. In some embodiments, the digital image modification manager 1102 compares an XMP file associated with an initial digital image with an XMP file associated with a modified digital image. In other embodiments, the digital image modification manager 1102 determines modifications made to a digital image by analyzing an action history associated with a digital image within a digital image editing application.

In addition, the tutorial generation system 102 includes an animated tutorial manager 1104. In particular, the animated tutorial manager 1104 manages, maintains, stores, generates, determines, creates, arranges, and/or identifies an animated tutorial. For example, the animated tutorial manager 1104 generates an animated tutorial including animated or visual representations of steps involved in making modifications to a digital image as part of an animated tutorial. In some embodiments, the animated tutorial manager 1104 generates a tutorial document or a tutorial file for an animated tutorial. Additionally, the animated tutorial manager 1104 communicates with the storage manager 1110 to store an animated tutorial and/or a tutorial document/file within the database 1112.

As shown, the tutorial generation system 102 further includes a deep link manager 1106. In particular, the deep link manager 1106 manages, generates, creates, determines, or identifies a deep link associated with an animated tutorial.

For example, the deep link manager 1106 links a reference to an animated tutorial and/or a digital image editing application to a deep link. In some embodiments, the deep link manager 1106 includes a reference to a stored tutorial document/file within the database 1112 such that the deep link causes a device to access and present the stored tutorial document/file upon selection.

Further, the tutorial generation system 102 includes publishing manager 1108. In particular, the publishing manager 1108 manages, maintains, provides, and/or generates a social media message for providing to learner devices and/or social networking systems. For example, based on an indication to publish an animated tutorial, the publishing manager 1108 generates and provides a social media message to a social networking system as described herein. In some embodiments, for instance, the publishing manager 1108 accesses a tutorial document and a deep link from the database 1112 to include within the social media message.

In one or more embodiments, each of the components of the tutorial generation system 102 are in communication with one another using any suitable communication technologies. Additionally, the components of the tutorial generation system 102 can be in communication with one or more other devices including one or more user devices described above. It will be recognized that although the components of the tutorial generation system 102 are shown to be separate in FIG. 11, any of the subcomponents may be combined into fewer components, such as into a single component, or divided into more components as may serve a particular implementation. Furthermore, although the components of FIG. 11 are described in connection with the tutorial generation system 102, at least some of the components for performing operations in conjunction with the tutorial generation system 102 described herein may be implemented on other devices within the environment.

The components of the tutorial generation system 102 can include software, hardware, or both. For example, the components of the tutorial generation system 102 can include one or more instructions stored on a computer-readable storage medium and executable by processors of one or more computing devices (e.g., the computing device 1100). When executed by the one or more processors, the computer-executable instructions of the tutorial generation system 102 can cause the computing device 1100 to perform the methods described herein. Alternatively, the components of the tutorial generation system 102 can comprise hardware, such as a special purpose processing device to perform a certain function or group of functions. Additionally or alternatively, the components of the tutorial generation system 102 can include a combination of computer-executable instructions and hardware.

Furthermore, the components of the tutorial generation system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the tutorial generation system 102 may be implemented as part of a stand-alone application on a personal computing device or a mobile device. Alternatively or additionally, the components of the tutorial generation system 102 may be implemented in any application that allows creation and delivery of marketing content to users, including, but not limited to, applications in ADOBE CREATIVE CLOUD, such as ADOBE ILLUSTRATOR, ADOBE PHOTO SHOP, ADOBE PREMIERE, ADOBE RUSH, and ADOBE LIGHTROOM. "ADOBE," "ADOBE ILLUSTRATOR," "ADOBE PHOTOSHOP," "ADOBE PREMIERE," "ADOBE RUSH," and "ADOBE LIGHTROOM" are trademarks of Adobe Inc. in the United States and/or other countries.

FIGS. 1-11, the corresponding text, and the examples provide a number of different systems, methods, and non-transitory computer readable media for generating and providing an animated tutorial for modifying a digital image. In addition to the foregoing, embodiments can also be described in terms of flowcharts comprising acts for accomplishing a particular result. For example, FIG. 12 illustrates a flowchart of an example sequence of acts in accordance with one or more embodiments.

Figure 12:
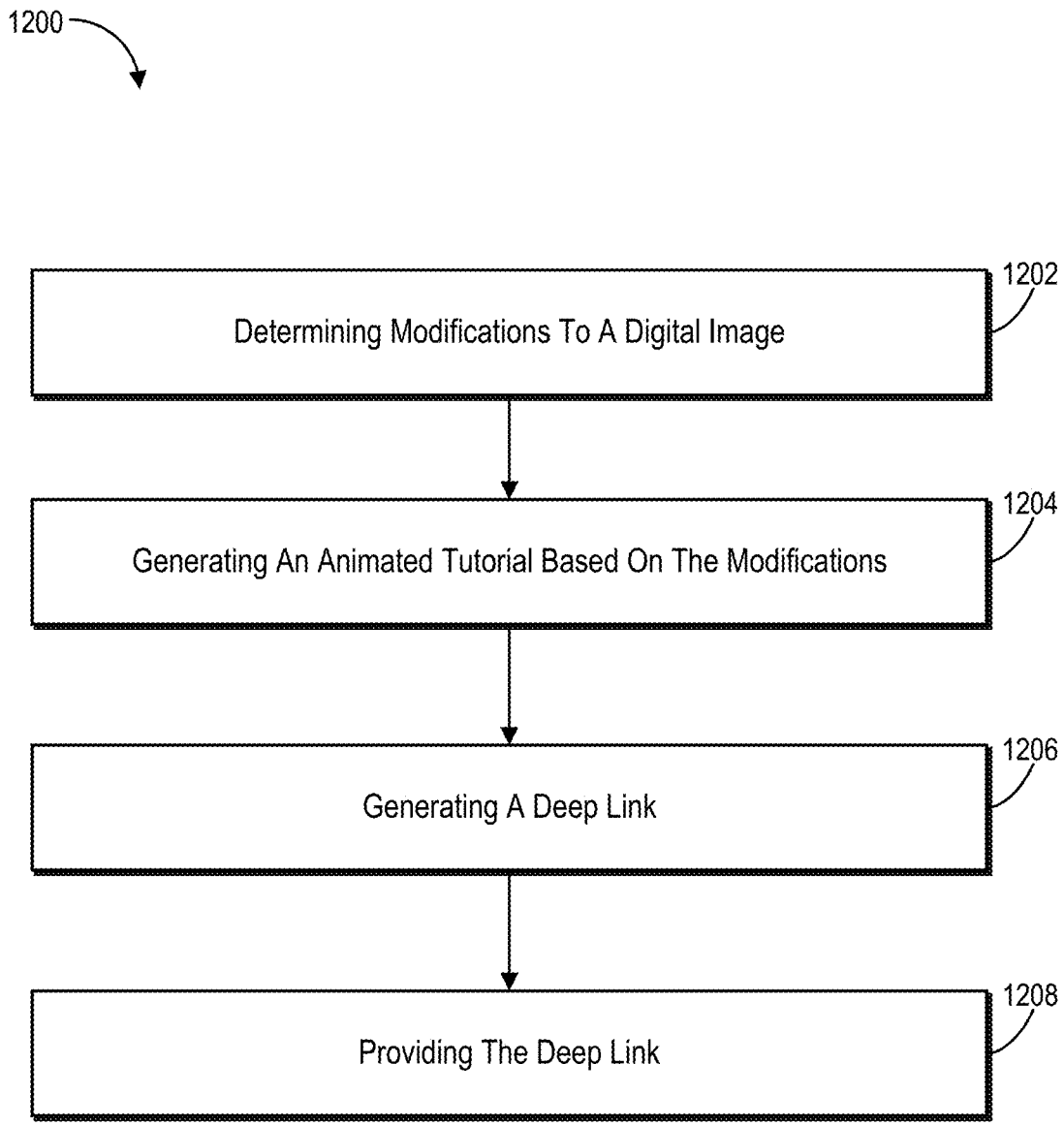
FIG. 12 illustrates a flowchart of a series of acts for generating and providing an animated tutorial for modifying a digital image in accordance with one or more embodiments.

While FIG. 12 illustrates acts according to one embodiment, alternative embodiments may omit, add to, reorder, and/or modify any of the acts shown in FIG. 12. The acts of FIG. 12 can be performed as part of a method. Alternatively, a non-transitory computer readable medium can comprise instructions, that when executed by one or more processors, cause a computing device to perform the acts of FIG. 12. In still further embodiments, a system can perform the acts of FIG. 12. Additionally, the acts described herein may be repeated or performed in parallel with one another or in parallel with different instances of the same or other similar acts.

FIG. 12 illustrates an example series of acts 1200 for generating and providing an animated tutorial for modifying a digital image. The series of acts 1200 includes an act 1202 of determining modifications to a digital image. In particular, act 1202 can involve determining one or more modifications to a digital image in relation to parameters of a digital image editing application on an educator device. The act 1202 can involve comparing an initial state of the digital image with a modified state of the digital image to determine changes to the parameters of the digital image editing application between the initial state and the modified state. In some embodiments, the act 1202 can involve analyzing an action history associated with the digital image editing application on the educator device.

As shown, the series of acts 1200 can include an act 1204 of generating an animated tutorial based on the modifications. In particular, the act 1204 can involve generating an animated tutorial based on the one or more modifications to the digital image, wherein the animated tutorial portrays changes to user interface elements of the digital image editing application to implement the one or more modifications. The animated tutorial can include a tutorial format compatible across multiple platforms, wherein the multiple platforms comprise a mobile device platform and a personal computer platform. The series of acts 1200 can include an act of adding educator information and customizable fields to the animated tutorial.

In some embodiments, the act 1204 can involve generating a first animation portraying a first change to a first user interface element of a digital image editing application based on a first modification. The act 1204 can also involve generating a second animation portraying a second change to a second user interface element of the digital image editing application based on a second modification. Further, the series of acts 1200 can include an act of analyzing an action history associated with the digital image editing application and an act of modifying the animated tutorial to include a third animation portraying a third change to a third user interface element of the digital image editing application based on the action history.

In addition, the series of acts 1200 can include an act 1206 of generating a deep link. In particular, the act 1206 can involve generating a deep link comprising a reference to the animated tutorial and the digital image editing application.

Further, the series of acts 1200 can include an act 1208 of providing the deep link. In particular, the act 1208 can involve providing the deep link such that a learner device interacting with the deep link executes the digital image editing application and displays the animated tutorial utilizing the digital image editing application.

The series of acts 1200 can further include an act of determining a measure of change to the digital image associated with a modification from the one or more modifications. In addition, the series of acts 1200 can include an act of determining that the measure of change corresponding to the modification fails to satisfy a threshold measure of change. Further, the series of acts 1200 can include an act of, based on the measure of change failing to satisfy the threshold measure of change, excluding the modification from the animated tutorial. In some embodiments, the series of acts 1200 can include an act of, based on the measure of change failing to satisfy the threshold measure of change, removing the modification from the animated tutorial.

Additionally, the series of acts 1200 can include an act of generating an animated visual representation of the animated tutorial for publishing together with the deep link. The series of acts 1200 can also include an act of providing a selectable option to publish the deep link together with the animated visual representation of the animated tutorial via a social networking system.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or other non-transitory storage devices which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
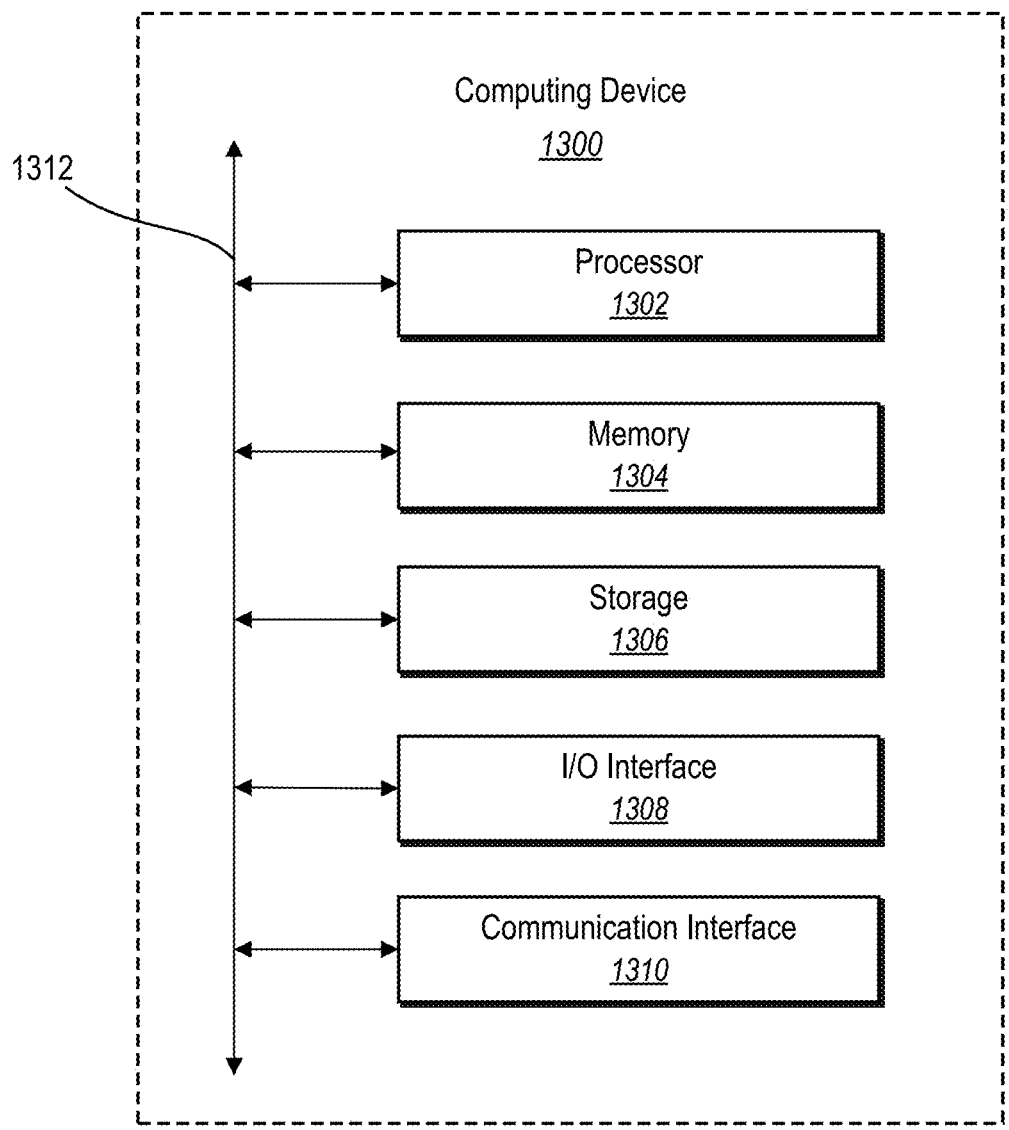
FIG. 13 illustrates a block diagram of an example computing device in accordance with one or more embodiments.

FIG. 13 illustrates, in block diagram form, an example computing device 1300 (e.g., the computing device 1100, the learner device 108, the educator device 110, and/or the server(s) 104) that may be configured to perform one or more of the processes described above. One will appreciate that the tutorial generation system 102 can comprise implementations of the computing device 1300. As shown by FIG. 13, the computing device can comprise a processor 1302, memory 1304, a storage device 1306, an I/O interface 1308, and a communication interface 1310. Furthermore, the computing device 1300 can include an input device such as a touchscreen, mouse, keyboard, etc. In certain embodiments, the computing device 1300 can include fewer or more components than those shown in FIG. 13. Components of computing device 1300 shown in FIG. 13 will now be described in additional detail.

In particular embodiments, processor(s) 1302 includes hardware for executing instructions, such as those making up a computer program. As an example, and not by way of limitation, to execute instructions, processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, storage device 1306 can comprise a non-transitory storage medium described above. The storage device 1306 may include a hard disk drive (HDD), flash memory, a Universal Serial Bus (USB) drive or a combination of these or other storage devices.

The computing device 1300 also includes one or more input or output ("I/O") devices/interfaces 1308, which are provided to allow a user to provide input to (such as user strokes), receive output from, and otherwise transfer data to and from the computing device 1300. These I/O devices/interfaces 1308 may include a mouse, keypad or a keyboard, a touch screen, camera, optical scanner, network interface, modem, other known I/O devices or a combination of such I/O devices/interfaces 1308. The touch screen may be activated with a writing device or a finger.

The I/O devices/interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1308 is configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 can provide one or more interfaces for communication (such as, for example, packet-based communication) between the computing device and one or more other computing devices 1300 or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can comprise hardware, software, or both that couples components of computing device 1300 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause a computer device to:

determine one or more modifications to a digital image in relation to parameters of a digital image editing application on an educator device;

generate an animated tutorial based on the one or more modifications to the digital image, wherein the animated tutorial comprises changes to the digital image editing application to implement the one or more modifications;

generate a deep link comprising a reference to the animated tutorial and the digital image editing application; and provide the deep link such that a learner device interacting with the deep link executes the digital image editing application and displays the animated tutorial utilizing the digital image editing application.

2. The non-transitory computer readable medium of claim 1, wherein the animated tutorial comprises a tutorial format compatible across multiple platforms, wherein the multiple platforms comprise a mobile device platform and a personal computer platform.

3. The non-transitory computer readable medium of claim 1, further comprising instructions that, when executed by the at least one processor, cause the computer device to determine the one or more modifications made to the digital image by comparing an initial state of the digital image with a modified state of the digital image to determine changes to the parameters of the digital image editing application between the initial state and the modified state.

4. The non-transitory computer readable medium of claim 1, further comprising instructions that, when executed by the at least one processor, cause the computer device to determine the one or more modifications made to the digital image by analyzing an action history associated with the digital image editing application on the educator device.

5. The non-transitory computer readable medium of claim 1, further comprising instructions that, when executed by the at least one processor, cause the computer device to:
  determine a measure of change to the digital image associated with a modification from the one or more modifications;
  determine that the measure of change corresponding to the modification fails to satisfy a threshold measure of change; and
  based on the measure of change failing to satisfy the threshold measure of change, exclude the modification from the animated tutorial.

6. The non-transitory computer readable medium of claim 1, further comprising instructions that, when executed by the at least one processor, cause the computer device to generate an animated visual representation of the animated tutorial for publishing together with the deep link.

7. The non-transitory computer readable medium of claim 6, further comprising instructions that, when executed by the at least one processor, cause the computer device to provide a selectable option to publish the deep link together with the animated visual representation of the animated tutorial via a social networking system.

8. The non-transitory computer readable medium of claim 1, further comprising instructions that, when executed by the at least one processor, cause the computer device to add educator information and customizable fields to the animated tutorial.

9. A system comprising:
  at least one processor; and
  a non-transitory computer readable medium comprising instructions that, when executed by the at least one processor, cause the system to:
    compare a modified state of a digital image with an initial state of the digital image to determine modifications to the digital image;
    generate an animated tutorial based on the modifications by:
      generating a first animation comprising a first change to a first parameter of a digital image editing application based on a first modification; and
      generating a second animation comprising a second change to a second parameter of the digital image editing application based on a second modification;
    generate a deep link comprising a reference to the animated tutorial and the digital image editing application; and
    provide the deep link such that a learner device interacting with the deep link executes the digital image editing application and displays the animated tutorial utilizing the digital image editing application.

10. The system of claim 9, wherein the animated tutorial comprises a tutorial format compatible across multiple platforms, wherein the multiple platforms comprise a mobile device platform and a personal computer platform.

11. The system of claim 9, further comprising instructions that, when executed by the at least one processor, cause the system to:
  analyze an action history associated with the digital image editing application; and
  modify the animated tutorial to include a third animation comprising a third change to a third parameter of the digital image editing application based on the action history.

12. The system of claim 9, further comprising instructions that, when executed by the at least one processor, cause the system to:
  determine a measure of change to the digital image associated with a given modification;
  determine that the measure of change corresponding to the given modification fails to satisfy a threshold measure of change; and
  based on the measure of change failing to satisfy the threshold measure of change, remove the given modification from the animated tutorial.

13. The system of claim 9, further comprising instructions that, when executed by the at least one processor, cause the system to generate an animated visual representation of the animated tutorial for publishing together with the deep link.

14. The system of claim 13, further comprising instructions that, when executed by the at least one processor, cause the system to provide a selectable option to publish the deep link together with the animated visual representation of the animated tutorial via a social networking system.

15. The system of claim 9, further comprising instructions that, when executed by the at least one processor, cause the system to add educator information and customizable fields to the animated tutorial.

16. In a digital medium environment for generating and publishing tutorials for modifying digital images, a computer-implemented method for generating a digital image editing tutorial, the computer-implemented method comprising:
  identifying an initial state of a digital image and a modified state of a digital image;
  generating an animated tutorial comprising changes to a digital image editing application to implement modifications between the initial state and the modified state of the digital image;
  generating a deep link comprising a reference to the animated tutorial and the digital image editing application; and
  providing the deep link such that a learner device interacting with the deep link executes the digital image editing application and displays the animated tutorial utilizing the digital image editing application.

17. The computer-implemented method of claim 16, wherein the animated tutorial comprises a tutorial format compatible across multiple platforms, wherein the multiple platforms comprise a mobile device platform and a personal computer platform.

18. The computer-implemented method of claim 16, further comprising, in response to a selection of the deep link via the learner device, providing the animated tutorial to the learner device for display via the digital image editing application.

19. The computer-implemented method of claim 16, further comprising generating an animated visual representation of the animated tutorial for publishing together with the deep link.

20. The computer-implemented method of claim 19, further comprising providing a selectable option to publish the deep link together with the animated visual representation of the animated tutorial via a social networking system.

* * * * *